US012800717B2

(12) United States Patent
Liu et al.

(10) Patent No.: US 12,800,717 B2
(45) Date of Patent: Nov. 17, 2026

(54) PHASE DIFFERENCE BASED OBJECT CLASSIFICATION IN SENSING

(71) Applicant: QUALCOMM Incorporated, San Diego, CA (US)

(72) Inventors: Kangqi Liu, San Diego, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 587 days.

(21) Appl. No.: 18/335,957

(22) Filed: Jun. 15, 2023

(65) Prior Publication Data

US 2024/0418829 A1 Dec. 19, 2024

(51) Int. Cl.
*G01S 7/00* (2006.01)
*G01S 7/41* (2006.01)

(52) U.S. Cl.
CPC .............. *G01S 7/412* (2013.01); *G01S 7/006* (2013.01); *G01S 7/417* (2013.01)

(58) Field of Classification Search
CPC .......... G01S 7/412; G01S 7/006; G01S 7/417; G01S 13/931; G01S 7/415; G01S 13/003; G01S 13/584; G06N 3/045; G06N 3/08
See application file for complete search history.

(56) References Cited

U.S. PATENT DOCUMENTS 10,671,921 B1 * 6/2020 Karon .................. G01C 21/206
2022/0104111 A1 3/2022 Zorgui et al.

FOREIGN PATENT DOCUMENTS

WO 2022031299 A1 2/2022
WO WO-2022109772 A1 * 6/2022 ............ H04W 48/16

OTHER PUBLICATIONS

S. Lim, S. Lee, J. Yoon and S.-C. Kim, "Phase-Based Target Classification Using Neural Network in Automotive Radar Systems," 2019 (Year: 2019).*

(Continued)

*Primary Examiner* — Vladimir Magloire
*Assistant Examiner* — Bongani Jabulani Mashele
(74) *Attorney, Agent, or Firm* — QUALCOMM Incorporated

(57) ABSTRACT

Apparatuses and methods for phase difference based object classification in sensing are described. An apparatus is configured to receive, from a network entity, a sensing configuration. The sensing configuration indicates measurements of a phase or a phase difference for classification of objects in sensing operations. The measurements are associated with a set of sensing entity antennas. The apparatus is configured to sense objects via the set of antennas, perform the measurements, and provide, for the network entity, an indication of the performed measurements of the phase and phase difference. An apparatus is configured to transmit, for a sensing entity, a sensing configuration. The sensing configuration indicates measurements of a phase or a phase difference for classification of objects in sensing operations. The measurements are associated with a set of antennas of the sensing entity. The apparatus is configured to obtain, from the sensing entity, an indication of the measurements.

28 Claims, 15 Drawing Sheets

(56) References Cited

OTHER PUBLICATIONS

AT&T: "AI/ML Model Transfer and Delivery", 3GPP TSG-RAN WG2 Meeting #122, R2-2306270, 3rd Generation Partnership Project, Mobile Competence Centre, 650, Route Des Lucioles, F-06921 Sophia-Antipolis Cedex, France, vol. RAN WG2, No. Incheon, Korea, May 22, 2023-May 26, 2023, May 12, 2023, XP052372485, 2 pages, Section 2.

International Search Report and Written Opinion—PCT/US2024/030563—ISA/EPO—Sep. 18, 2024.

Narayanan S.J., et al., "Fuzzy Decision Trees Embedded with Evolutionary Fuzzy Clustering for Locating Users Using Wireless Signal Strength in an Indoor Environment", International Journal of Intelligent Systems, Wiley, New York, NY, US, vol. 36, No. 8, May 16, 2021, XP071712233, pp. 4280-4297, Abstract, Sections 1 and 2.

Rai A., et al., "Zee: Zero-Effort Crowdsourcing for Indoor Localization", Proceedings of the 18th Annual International Conference on Mobile Computing and Networking, Aug. 22, 2012, pp. 293-304, XP093197510, 12 pages, Sections 1-8.

* cited by examiner

200
One Frame (TDD)
10 ms
0 1 2 3 4 5 6 7 8 9
subframe
RB
slot
D D D D D D D D D D D D F U
0 1 2 3 4 5 6 7 8 9 10 11 12 13
R
OFDM symbol
slot
subcarrier
0 1 2 3 4 5 6 7 8 9 10 11
DMRS R
CSI-RS 230
PDCCH CORESET
SSS
PSS
PDSCH
PBCH
REG 12 REs
1 CCE = 6 REGs
SS/PBCH Block
BWP
BWP
20 RBs
channel bandwidth RBs 250
One Frame (TDD)
10 ms
subframe
RB
slot
U U U U U U U U U U U U U U
R
OFDM symbol
slot
SRS
subcarrier
SRS Comb 0
SRS Comb 1
DMRS R

280
PUCCH
PUSCH

PHASE DIFFERENCE BASED OBJECT CLASSIFICATION IN SENSING

TECHNICAL FIELD

The present disclosure relates generally to communication systems, and more particularly, to wireless communications utilizing sensing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is configured to receive, from a network entity, a sensing configuration, where the sensing configuration indicates at least one measurement of a phase or a phase difference for classification of objects in sensing operations, where the at least one measurement is associated with a set of antennas of the sensing entity. The apparatus is also configured to sense, based on the sensing configuration, at least one object via the set of antennas. The apparatus is also configured to perform the at least one measurement of the phase or the phase difference associated with the at least one sensed object. The apparatus is also configured to provide, for the network entity and based on the sensing configuration, an indication of the at least one performed measurement of the phase or the phase difference.

In the aspect, the method includes receiving, from a network entity, a sensing configuration, where the sensing configuration indicates at least one measurement of a phase or a phase difference for classification of objects in sensing operations, where the at least one measurement is associated with a set of antennas of the sensing entity. The method also includes sensing, based on the sensing configuration, at least one object via the set of antennas. The method also includes performing the at least one measurement of the phase or the phase difference associated with the at least one sensed object. The method also includes providing, for the network entity and based on the sensing configuration, an indication of the at least one performed measurement of the phase or the phase difference.

In an aspect of the disclosure, a method, a computer-readable medium, and an apparatus are provided. The apparatus is configured to transmit, for a sensing entity, a sensing configuration, where the sensing configuration indicates at least one measurement of a phase or a phase difference for classification of objects in sensing operations, where the at least one measurement is associated with a set of antennas of the sensing entity. The apparatus is also configured to obtain, from the sensing entity and based on the sensing configuration, an indication of the at least one measurement of the phase or the phase difference.

In the aspect, the method includes transmitting, for a sensing entity, a sensing configuration, where the sensing configuration indicates at least one measurement of a phase or a phase difference for classification of objects in sensing operations, where the at least one measurement is associated with a set of antennas of the sensing entity. The method also includes obtaining, from the sensing entity and based on the sensing configuration, an indication of the at least one measurement of the phase or the phase difference.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
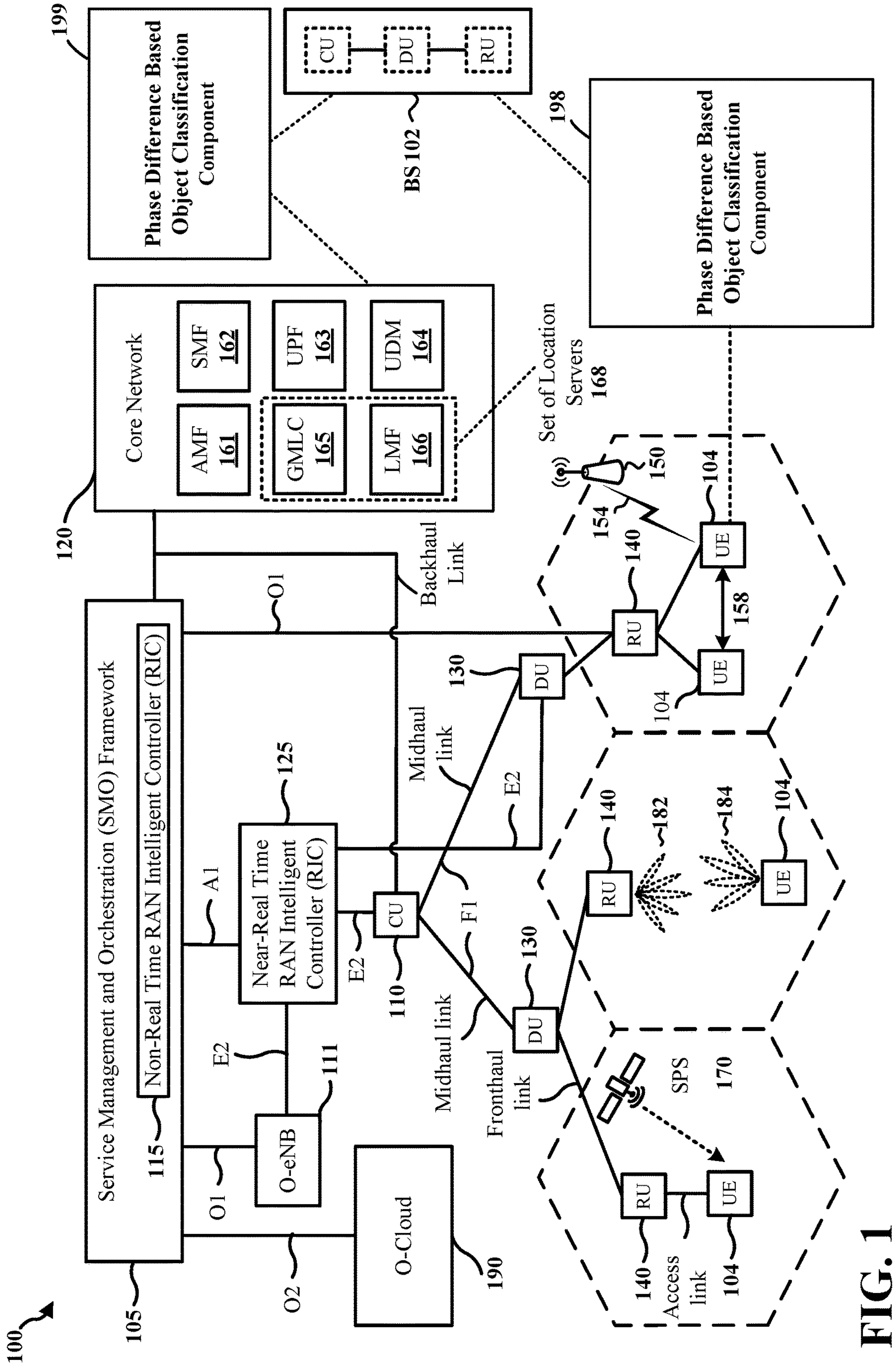
FIG. 1 is a diagram illustrating an example of a wireless communications system and an access network.

Wireless communication networks, such as a 5G NR network, may enable sensing measurements and operations for wireless devices. For example, a wireless communication network and/or a wireless device may utilize a specific waveform for communications and sensing, such as radio detection and ranging (RADAR) waveforms, orthogonal frequency division multiplexing (OFDM) waveforms, etc., also known as joint communication-sensing (JCS) or integrated sensing and communications (ISAC). The use of such a waveform may provide for low cost, allow flexibility, and allow the re-use of sensing waveforms for multiple purposes. As the bandwidth allocated for cellular communications system (e.g., 5G and 5G+) becomes larger, and more use cases are introduced with cellular communications system, JCS/ISAC may also be a much-utilized feature for future cellular systems (e.g., 6G). Systems utilizing RADAR may send probing signals to uncooperative targets, and infer useful information contained in the target echoes. In some communication systems, information exchange may occur between two or more cooperative transceivers. With JCS/ISAC, an integrated system may simultaneously perform both wireless communication and remote RADAR sensing, thus providing a cost-efficient deployment for both RADAR and communication systems. That is, time, frequency, and/or spatial radio resources may be allocated to support two purposes (e.g., communication and sensing) in such integrated system.

In automotive RADAR sensing systems, frequency-modulated continuous wave (FMCW) RADAR may generally be equipped in vehicles to extract the target information with respect to the relative velocity and relative range. As the targets may be detected even in bad weather conditions or low light environments, RADAR provide useful functions for drivers, such as adaptive cruise control, autonomous emergency braking, blind spot detection, and/or the like. Target recognition and classification may also impact sensing systems as they are related to the lives of people. However, existing classification mechanisms may lack the ability to distinguish between different types of objects, such as between pedestrians and vehicles.

Various aspects relate generally to wireless communications systems and sensing operations for wireless devices. Some aspects more specifically relate to phase difference based object classification in sensing. In one example, a sensing entity may receive, from a network entity, a sensing configuration, where the sensing configuration indicates at least one measurement of a phase or a phase difference for classification of objects in sensing operations, where the at least one measurement is associated with a set of antennas of the sensing entity. The sensing entity may also sense, based on the sensing configuration, at least one object via the set of antennas. The sensing entity may also perform the at least one measurement of the phase or the phase difference associated with the at least one sensed object. The sensing entity may also provide, for the network entity and based on the sensing configuration, an indication of the at least one performed measurement of the phase or the phase difference. The sensing entity may receive, from the network entity, a second indication of a neural network (NN) model for inference. The sensing entity may classify, via the NN model, the at least one sensed object based on the phase or the phase difference from the set of antennas of the sensing entity. The sensing entity may provide, for the network entity, a response to the crowdsourcing indication. The sensing entity may receive, from the network entity, at least one scheduled resource for the at least one measurement of the phase or the phase difference and the indication, where to provide the indication, the sensing entity may provide the indication via the at least one scheduled resource. In another example, a network entity may transmit, for a sensing entity, a sensing configuration, where the sensing configuration indicates at least one measurement of a phase or a phase difference for classification of objects in sensing operations, where the at least one measurement is associated with a set of antennas of the sensing entity. The network entity may also obtain, from the sensing entity and based on the sensing configuration, an indication of the at least one measurement of the phase or the phase difference. The network entity may provide, for the sensing entity, a second indication of a NN model for inference, where the NN model is configured for the classification of the objects based on the at least one measurement of the phase or the phase difference associated with the set of antennas of the sensing entity. The network entity may receive, from the sensing entity, a response to the crowdsourcing indication. The network entity may provide, for the sensing entity, at least one scheduled resource for the at least one measurement of the phase or the phase difference and the indication, where to receive the indication, the network entity may receive the indication via the at least one scheduled resource.

Particular aspects of the subject matter described in this disclosure can be implemented to realize one or more of the following potential advantages. In one example, by obtaining phase and phase difference measurements of sensing targets, the described techniques can be used to determine variances of motion via Doppler and/or micro-Doppler effects for NN training. In another example, by training and utilizing a NN model based on the phase and phase difference measurements, the described techniques can be used to improve sensing target classifications, e.g., types of objects/targets. In an additional example, by performing crowd-sourcing operations for phase and phase difference measurements, e.g., based on differing measurements across antennas of a sensing entity, the described techniques can be used to further improve sensing target classifications and ML training of NN models.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as AI policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a phase difference based object classification component 198 ("component 198") that may be configured to receive, from a network entity, a sensing configuration, where the sensing configuration indicates at least one measurement of a phase or a phase difference for classification of objects in sensing operations, where the at least one measurement is associated with a set of antennas of the sensing entity. The component 198 may also be configured to sense, based on the sensing configuration, at least one object via the set of antennas. The component 198 may also be configured to perform the at least one measurement of the phase or the phase difference associated with the at least one sensed object. The component 198 may also be configured to provide, for the network entity and based on the sensing configuration, an indication of the at least one performed measurement of the phase or the phase difference. The component 198 may be configured to receive, from the network entity, a second indication of a NN model for inference. The component 198 may be configured to classify, via the NN model, the at least one sensed object based on the phase or the phase difference from the set of antennas of the sensing entity. The component 198 may be configured to provide, for the network entity, a response to the crowdsourcing indication. The component 198 may be configured to receive, from the network entity, at least one scheduled resource for the at least one measurement of the phase or the phase difference and the indication, where to provide the indication, the component 198 may be configured to provide the indication via the at least one scheduled resource. In certain aspects, the base station 102 may also have the component 198. In certain aspects, the base station 102 and/or the core network 120 may have a phase difference based object classification component 199 ("component 199") that may be configured to transmit, for a sensing entity, a sensing configuration, where the sensing configuration indicates at least one measurement of a phase or a phase difference for classification of objects in sensing operations, where the at least one measurement is associated with a set of antennas of the sensing entity. The component 199 may also be configured to obtain, from the sensing entity and based on the sensing configuration, an indication of the at least one measurement of the phase or the phase difference. The component 199 may be configured to provide, for the sensing entity, a second indication of a NN model for inference, where the NN model is configured for the classification of the objects based on the at least one measurement of the phase or the phase difference associated with the set of antennas of the sensing entity. The component 199 may be configured to receive, from the sensing entity, a response to the crowdsourcing indication. The component 199 may be configured to provide, for the sensing entity, at least one scheduled resource for the at least one measurement of the phase or the phase difference and the indication, where to receive the indication, the component 199 may be configured to receive the indication via the at least one scheduled resource. That is, the aspects herein for phase difference based object classification in sensing utilize the phases and phase differences of received signals from multiple antennas of a sensing entity for sensing target/object classification assisted by NN models. Such aspects provide for determinations of variances in motions via Doppler and/or micro-Doppler effects for NN training by obtaining phase and phase difference measurements of sensing targets, provide for improved sensing target classifications, e.g., types of objects/targets, by training and utilizing a NN model based on the phase and phase difference measurements, and provide for further improved sensing target classifications and ML training of NN models by performing crowdsourcing operations for phase and phase difference measurements, e.g., based on differing measurements across antennas of a sensing entity.

Figures 2A, 2B, 2C, 2D:
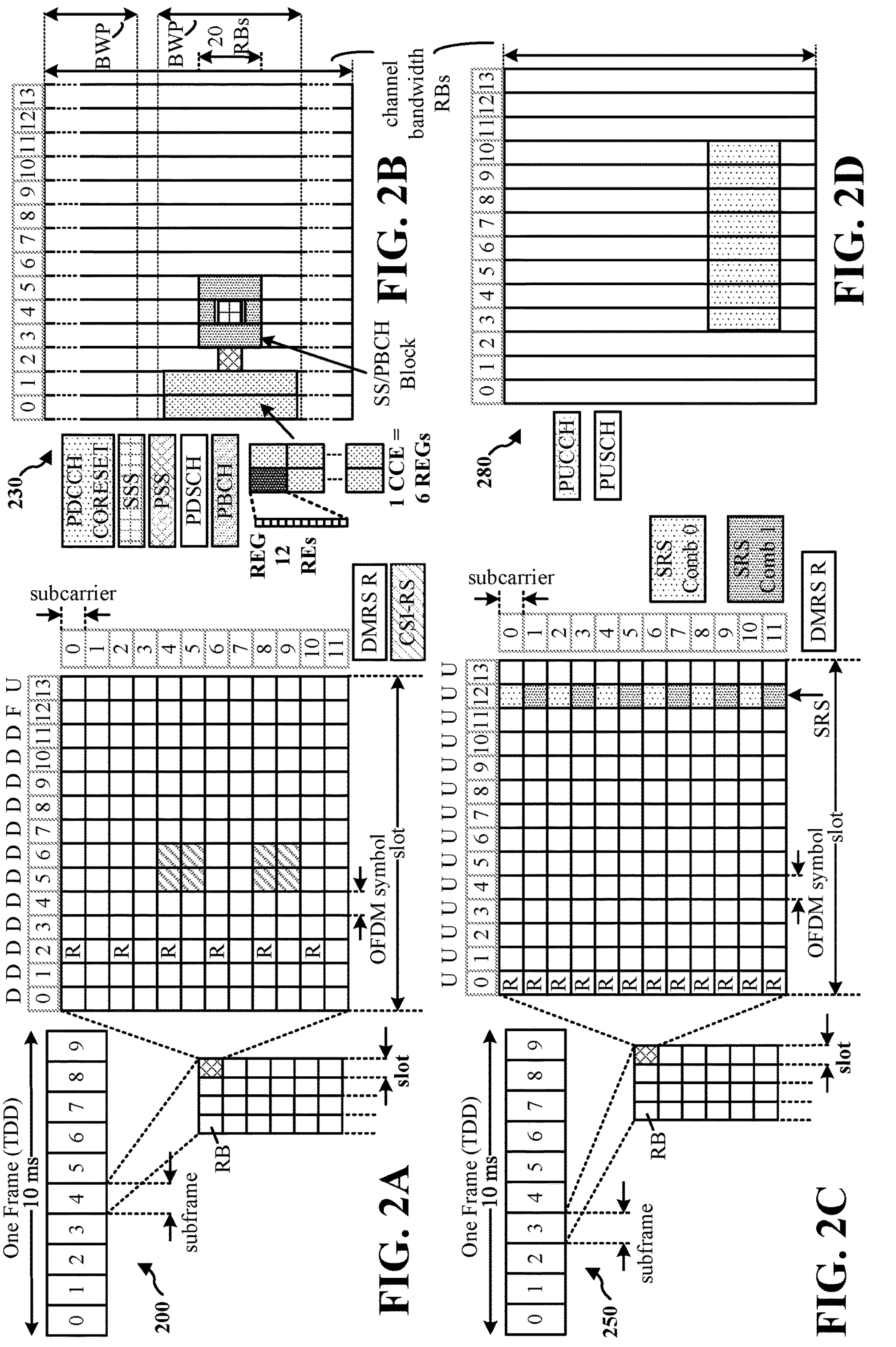
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
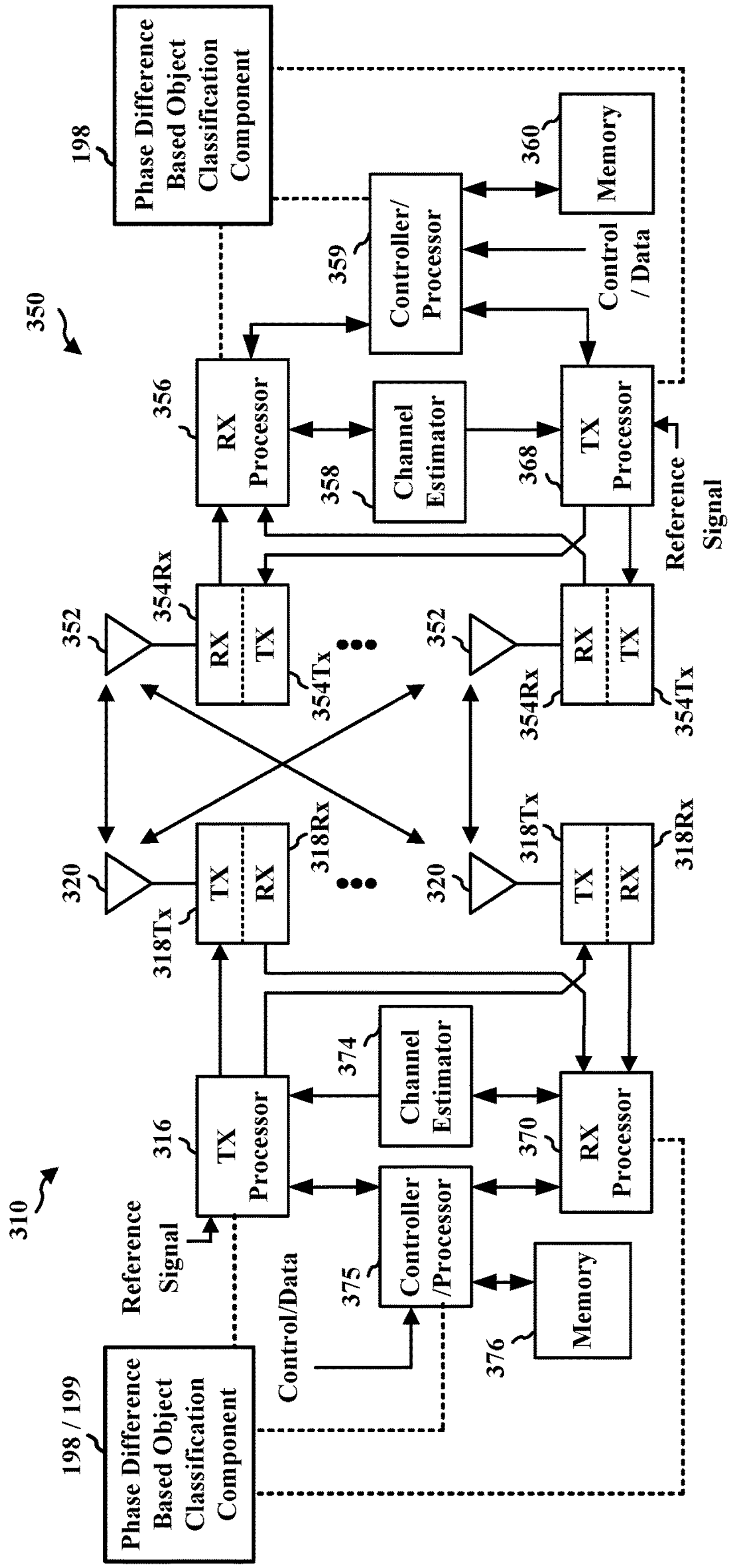
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 of FIG. 1. At least one of the TX processor 316, the RX processor 370, and the controller/processor 375 may be configured to perform aspects in connection with the component 199 of FIG. 1.

Figure 4:
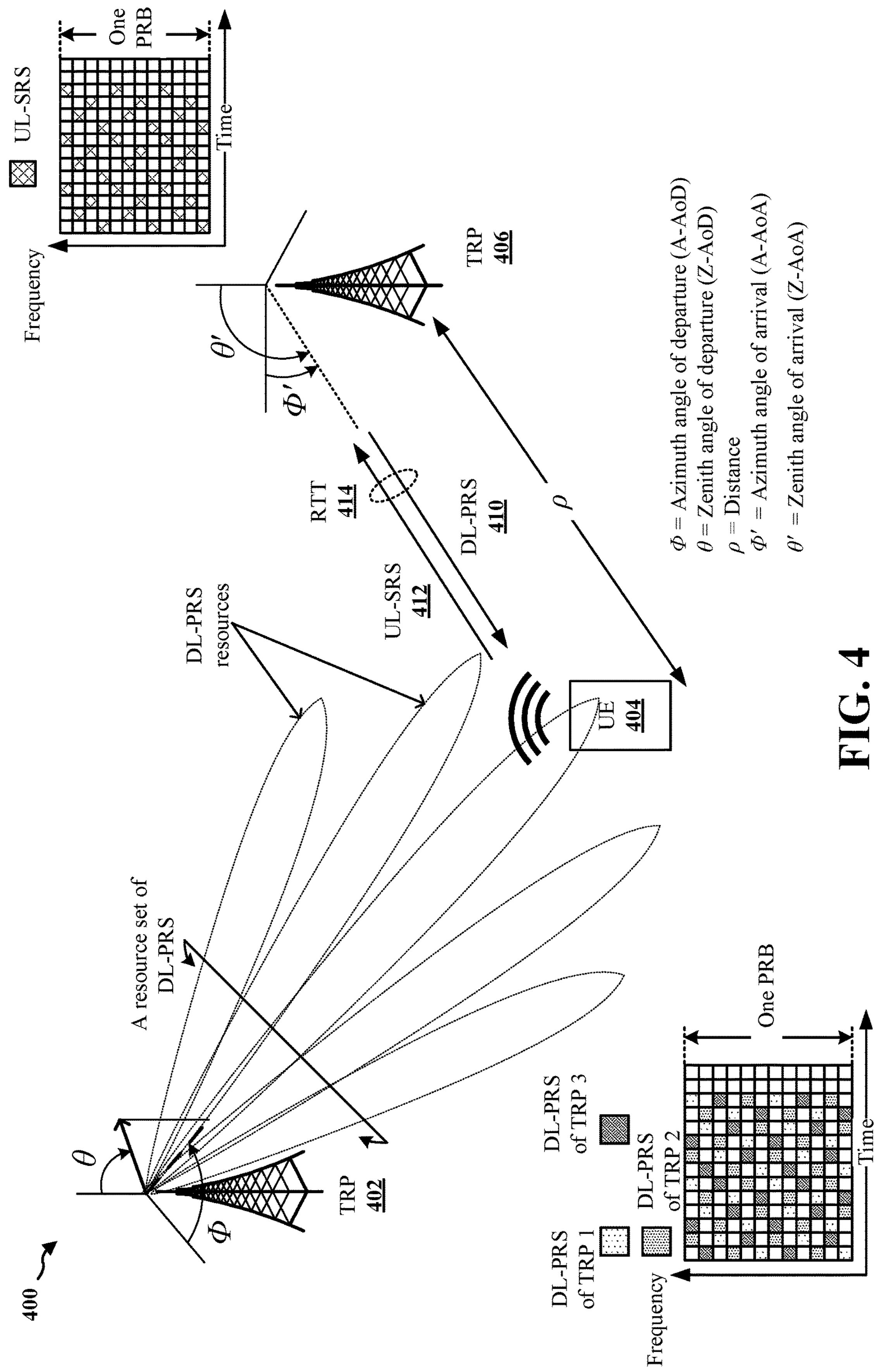
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx−Tx time difference measurements (i.e., $|T_{SRS\_RX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx−Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx−Tx time difference measurements (and optionally DL-PRS-RSRP of the received signals) using assistance data received from the positioning server, and the TRPs 402, 406 measure the gNB Rx−Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

In another example, a first wireless device may receive signals transmitted from a second wireless device, where the first wireless device may determine or estimate a distance between the first wireless device and the second wireless device based on the received signals. For example, a tracking device (e.g., a Bluetooth™ tracker, an item tracker, an asset tracking device, etc.) may be configured to regularly transmit signals (e.g., beacon signals) or small amounts of data to a receiving device, such that the receiving device may be able to monitor the location or the relative distance of the tracking device. As such, a user may be able to track the location of an item (e.g., a car key, a wallet, a remote controller, etc.) by attaching the tracking device to the item.

In addition to network-based UE positioning technologies, a wireless device (e.g., a UE, an AP, etc.) may also be configured to include sensing capabilities, where the wireless device may be able to sense (e.g., detect and/or track) one or more objects or target entities (or objects) of an area or in an environment, including users and other people, based on radio frequencies/RADAR. An environment may refer to a particular geographical area or place, especially as affected by human activity, or the circumstances, objects, or conditions by which one is surrounded. For example, a wireless device may include a RADAR capability (which may be referred to as "RF sensing" and/or "cellular-based RF sensing), where the wireless device may transmit reference signals (e.g., RADAR reference signals (RRSs)) and measure the reference signals reflected from one or more objects (e.g., structures, walls, living objects, poses/gestures of users, and/or other things in an environment, etc.). Based on the measurement, the wireless device may determine or estimate a distance between the wireless device and the one or more objects and/or obtain environmental information associated with its surrounding including, but without limitation, range, Doppler, and/or angle information of sensing target entities. For purposes of the present disclosure, a device/apparatus that is capable of performing sensing (e.g., transmitting and/or receiving signals for detecting at least one object or for estimating the distance between the device and the at least one object) may be referred to as a "sensing device," a "sensing node," or a "sensing entity." For example, a sensing device may be a UE, an AP device (e.g., a Wi-Fi router), a base station, a component of the base station, a TRP, a device capable of performing radar functions, etc. Furthermore, a target entity may be any object (e.g., a person, a vehicle, a UE, etc.) for which a positioning or sensing session/operation is performed, for example, to determine a location thereof, a velocity thereof, a heading thereof, a physiological characteristic thereof, etc. In addition, a device/apparatus that is capable of transmitting signals to a sensing device for the sensing device to determine the location or the relative distance of the device/apparatus may be referred to as a "tracking device," a "tracker," or a "tag."

RADAR waveforms, may include, without limitation, continuous wave (CW) or analog waveforms and pulsed RADAR waveforms. CW waveforms may include FMCW waveforms, as well as pulse-modulated CW (PMCW) waveforms. Examples of FMCW waveforms may include linear FMCW waveforms (e.g., CW linear frequency modulation (LMF) waveforms, including sawtooth, triangle, and/or the like), non-linear FMCW waveforms (e.g., sinusoidal, multi-frequency, pseudorandom, and/or the like), and/or the like. Pulsed RADAR waveforms may include pulse-to-pulse modulation waveforms (e.g., frequency agility, stepped frequency, etc.) and intra-pulse modulation waveforms with frequency modulated (e.g., linear/non-linear frequency modulation) and phase modulated (e.g., bi-/poly-phase) subsets.

Aspects may be described in the context of RADAR and/or FMCW waveforms, or sensing generally, for descriptive and illustrative purposes, aspects are not so limited and may be applicable to other types of resources and operations, as would be understood by persons of skill in the relevant art(s) having the benefit of this disclosure, e.g., OFDM waveforms and/or the like.

Wireless communication networks and/or a wireless devices may utilize a specific waveform for communications and sensing, such as RADAR waveforms, OFDM waveforms, etc., for JCS/ISAC. The use of such a waveform may provide for low cost, allow flexibility, and allow the re-use of sensing waveforms for multiple purposes. As the bandwidth allocated for cellular communications system (e.g., 5G and 5G+) becomes larger, and more use cases are introduced with cellular communications system, JCS/ISAC may also be a much-utilized feature for future cellular systems (e.g., 6G). Systems utilizing RADAR may send probing signals to uncooperative targets, and infer useful information contained in the target echoes. In some communication systems, information exchange may occur between two or more cooperative transceivers. With JCS/ISAC, an integrated system may simultaneously perform both wireless communication and remote RADAR sensing, thus providing a cost-efficient deployment for both RADAR and communication systems. That is, time, frequency, and/or spatial radio resources may be allocated to support two purposes (e.g., communication and sensing) in such integrated system. In automotive RADAR sensing systems, FMCW RADAR may generally be equipped in vehicles to extract the target information with respect to the relative velocity and relative range. As the targets may be detected even in bad weather conditions or low light environments, RADAR provide useful functions for drivers, such as adaptive cruise control, autonomous emergency braking, blind spot detection, and/or the like. Target recognition and classification may also impact sensing systems as they are related to the lives of people. However, existing classification mechanisms may lack the ability to distinguish between different types of objects, such as between pedestrians and vehicles.

The described aspects for sensing operations, e.g., phase difference based object classification in sensing, enable wireless devices and base stations, etc., as sensing entities, for improved sensing and target classifications. Various aspects herein, such as for phase difference based object classification in sensing, may provide for determinations of variances in motions via Doppler and/or micro-Doppler effects for NN training by obtaining phase and phase difference measurements of sensing targets. Aspects herein may provide for improved sensing target classifications, e.g., types of objects/targets, by training and utilizing a NN model based on the phase and phase difference measurements. Aspects herein may also provide for further improved sensing target classifications and ML training of NN models by performing crowdsourcing operations for phase and phase difference measurements, e.g., based on differing measurements across antennas of a sensing entity.

When parts of the target vibrate or rotate, the phase difference between signals received at adjacent array antenna elements change due to micro-Doppler effect. In one aspect, we use the phases of the received signals from multiple FMCW radar antennas for object classification by a neural network. For example, when a pedestrian is walking, in addition to the bulk translation of the body, the legs and arms periodically rotate; when the car is traveling on the road, the wheel(s) rotate. This is used by a deep neural network to classify the object. Furthermore, the sensing server may collect crowd-sourced reports from various sensing nodes.

Figure 5:
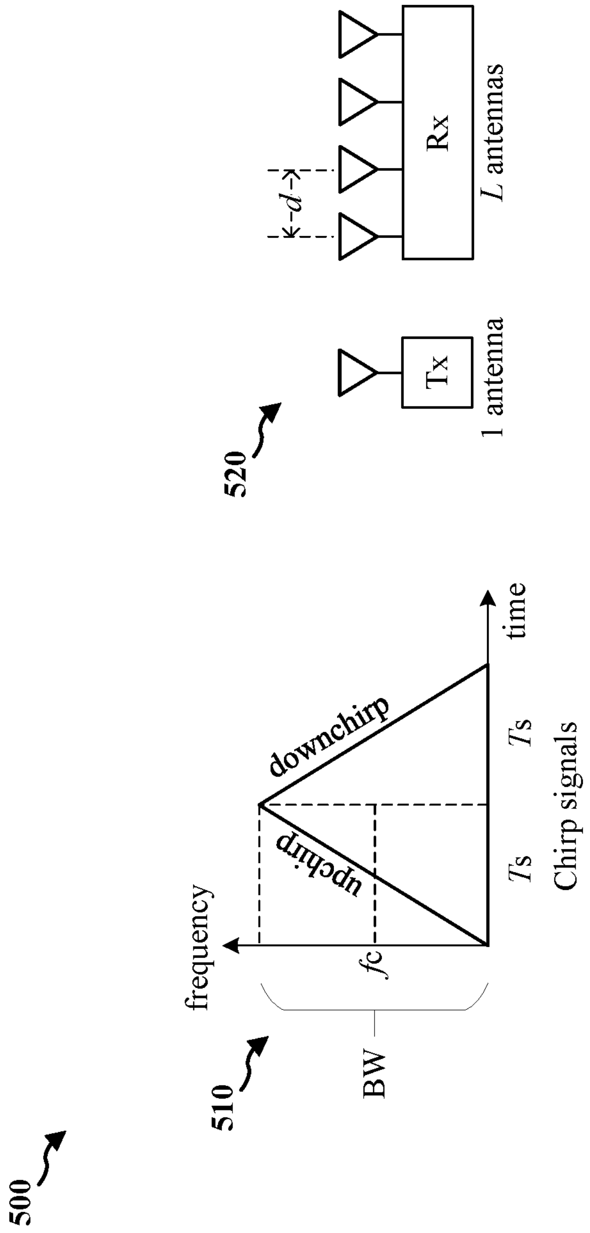
FIG. 5 is a diagram illustrating an example of chirp signals and processing, in accordance with various aspects of the present disclosure.

FIG. 5 is a diagram 500 illustrating an example of chirp signals and processing, in various aspects. Diagram 500 shows, by way of example, a chirp signal 510 and antenna configurations 520.

The chirp signal 510, illustrated with respect frequency over time, includes a bandwidth (BW) having a center frequency ($f_c$), an upchirp portion ("rising in frequency") with a duration Ts and a downchirp portion ("falling in frequency") with a duration Ts. In some aspects, the chirp signal 510 may be for a FMCW waveform, and may be described herein for transmitting (Tx) and for receiving (Rx) sensing scenarios.

In the context of sensing Tx, the upchirp signal portion may be represented as:

$$x(t) = A\ \exp\left(j\left(2\pi\left(f_c - \frac{BW}{2}\right)t + \pi\cdot\frac{BW}{T_s}\cdot t^2\right)\right),$$

where $0 \le t \le T_S$, and the downchirp signal portion may be represented as:

$$x(t) = A\ \exp\left(j\left(2\pi\left(f_c + \frac{BW}{2}\right)(t - T_s) - \pi\cdot\frac{BW}{T_s}\cdot(t - T_s)^2\right)\right),$$

where $T_S \le t \le 2T_S$.

In the context of sensing Rx, the upchirp/downchirp received signal portions may be the same, or similar as, the Tx case above for monostatic sensing, while in bistatic cases, upchirp received signal portion may be represented as:

$$y(t) = \sum_{m=1}^{M} A_m\ \exp\left(j\left(2\pi\left(f_c + f_{d,m} - \frac{BW}{2}\right)(t - t_{d,m}) + \pi\cdot\frac{BW}{T_s}\cdot(t - t_{d,m})^2\right)\right) + n(t),$$

where $t_{d,m} \le t \le T_S + t_{d,m}$ and where $t_{d,m}$ represents the time delay by the $m^{th}$ object, and the downchirp received signal portion may be represented as:

$$y(t) = \sum_{m=1}^{M} A_m\ \exp\left(j\left(2\pi\left(f_c + f_{d,m} + \frac{BW}{2}\right)(t - T_s - t_{d,m}) - \pi\cdot\frac{BW}{T_s}\cdot(t - T_s - t_{d,m})^2\right)\right) + n(t),$$

where $T_S + t_{d,m} \le t \le 2\ T_S + t_{d,m}$ and where $t_{d,m}$ represents the time delay by the $m^{th}$ object.

Beat frequencies after being combined with the transmitted signal (e.g., for monostatic sensing), or with locally generated chirp signals (e.g., for bistatic sensing), may be represented as:

$$f_m^u = \frac{BW}{T_s}t_{d,m} - f_{d,m} = \frac{BW}{T_s}\cdot\frac{2R_m}{c} - \frac{2v_m}{c}\cdot f_c\ (upchirp),\ \text{and}$$

$$f_m^d = \frac{BW}{T_s}t_{d,m} + f_{d,m} = \frac{BW}{T_s}\cdot\frac{2R_m}{c} + \frac{2v_m}{c}\cdot f_c\ (downchirp),$$

where $R_m$ and $v_m$ are the relative distance and velocity of the $m^{th}$ target, respectively.

The antenna configurations 520 show, by way of example, a Tx configuration having a single antenna for transmission of sensing signals, and an Rx configuration having multiple antennas for reception of sensing signals, e.g., an antenna array. In aspects, one or more antennas may form a set of antennas, and in some aspects herein, a set of Rx antennas may be a set of two or more antennas as an antenna array.

In the context of aspects for sensing via FMCW waveforms, when considering a uniform linear array with L elements and an antenna spacing of d between the elements, phase difference between signals received at the adjacent array antenna elements should be constant. However, when the sensing target or parts of the sensing target vibrate or rotate (e.g., a pedestrian swinging their arms while walking; car tires rotating), the phase additionally changes due to the micro-Doppler effect. Accordingly, phase difference shows a different tendency, despite it being single object.

The received signal at the l-th antenna can be represented as:

$$y(t) = \sum_{m=1}^{M} A_m\ \exp\left(j2\pi\left(\left(\frac{BW}{T_s}t_{d,m} - f_{d,m}\right)t + \left(f_c + f_{d,m} - \frac{BW}{2}\right)t_{d,m} - \frac{BW}{2T_s}t_{d,m}^2 + (l-1)kd\ \sin\ \theta_m + \varphi_{m,l}\right)\right) + n(t),$$

where $$\left(\frac{BW}{T_s}t_{d,m} - f_{d,m}\right)$$

may represent $$f_m^u,$$

noted above, where a phase $$\Phi_{m,l}^u$$

may be defined as $$\left(f_c + f_{d,m} - \frac{BW}{2}\right)t_{d,m} - \frac{BW}{2T_s}t_{d,m}^2 + (l-1)kd\ \sin\ \theta_m + \varphi_{m,l},$$

$$\text{where } k = \frac{2\pi}{\lambda} = \frac{2\pi f_c}{c} \text{ and } \theta_m$$

is the incident angle on the antenna elements, and where $\varphi_{m,l}$ is the phase extracted from the baseband signal. Further, a phase difference for the upchirp may be defined as $$\Delta\Phi_{m,l}^u = \Phi_{m,l+1}^u - \Phi_{m,l}^u,$$

and the downchirp portion of the signal may be obtained by replacing t with $t - T_S$ and BW with $-BW$.

Thus, $$\Phi^{u}_{m,l} \text{ and } \Delta\Phi^{u}_{m,l},$$

and corresponding values for $$\Phi^{d}_{m,l} \text{ and } \Delta\Phi^{d}_{m,l},$$

may be utilized to classify between different sensing targets/objects, e.g., pedestrians, vehicles, and/or the like. In aspects, such classifications may be assisted by a neural network, as described in further detail herein.

As noted above, aspects may also be utilized with OFDM waveforms and/or the like. For instance, $$\Phi^{u}_{m,l} \text{ and } \Delta\Phi^{u}_{m,l},$$

etc., may be obtained through other waveforms to classify between different sensing targets/objects, e.g., pedestrians, vehicles, and/or the like, and such classifications may also be assisted by a neural network, as described in further detail herein.

OFDM implementations may be described in the context of baseband (BB) and RF signals. For instance, the BB signal at the Tx may be represented as:

$$x_{BB}(t) = \sqrt{\frac{P}{N_{SC}}} \sum_{k=0}^{N_{SC}-1} s_{k,n} e^{j2\pi k\Delta f(t-nT_{sym})}\, rect\left(\frac{t-nT_{sym}+T_{CP}}{T_{sym}}\right).$$

For the Rx signals, the RF signal may be represented as:

$$y_{RF}(t) = \alpha e^{j\theta} x_{BB}(t-\tau_{mov}(t)) e^{j2\pi f_c(c-\tau_{mov}(t))},$$

the BB signal may be represented as:

$$y_{BB}(t) = \alpha e^{j\theta} e^{-j2\pi f_c \tau} \sqrt{\frac{P}{N_{SC}}} \sum_{k=0}^{N_{SC}-1} s_{k,n} e^{j2\pi k\Delta f((1-\gamma)t-\tau-nT_{sym})} \cdot e^{j2\pi f_d t}\, rect\left(\frac{(1-\gamma)t-\tau-nT_{sym}+T_{CP}}{T_{sym}}\right),$$

and the discrete BB signal may be represented as:

$$y_{BB}[m,n] = \alpha e^{j\theta} e^{-j2\pi f_c \tau} \sqrt{\frac{P}{N_{SC}}} \sum_{k=0}^{N_{SC}-1} s_{k,n}\, e^{j2\pi k\Delta f(mT_s-\tau-\gamma(mT_s+nT_{sym}))} e^{j2\pi f_d mT_s} e^{j2\pi f_d nT_{sym}} = \alpha e^{j\theta} e^{-j2\pi f_c \tau} \cdot \sqrt{\frac{P}{N_{SC}}}$$

-continued $$\left(\sum_{k=0}^{N_{SC}-1} s_{k,n}\, e^{j2\pi k\Delta f mT_s} e^{-j2\pi k\Delta f\tau} e^{j2\pi mT_s(f_d-k\Delta f\gamma)} e^{-j2\pi k\Delta f\gamma nT_{sym}}\right) \cdot e^{j2\pi f_d nT_{sym}}.$$

After application of a Fast Fourier Transform (FFT), it may be determined that:

$$z_{BB}[k,n] \approx \tilde{\alpha} e^{j\tilde{\theta}} e^{-j2\pi k\Delta f\tau} e^{j2\pi f_d nT_{sym}},$$

where $e^{-j2\pi k\Delta f\tau}$ is associated with the range, and where $e^{j2\pi f_d nT_{sym}}$ is associated with the Doppler. Accordingly, the phase and the phase difference may be obtained, respectively, as:

$$\Phi^{u}_{m,l} = \frac{\tilde{\theta}}{2\pi} - k\Delta f\tau + f_d nT_{sym}$$

and $$\Delta\Phi^{u}_{m,l} = \Phi^{u}_{m,l+1} - \Phi^{u}_{m,l}.$$

Thus, the phase $$\Phi^{u}_{m,l}$$

and the phase difference $$\Delta\Phi^{u}_{m,l}$$

may be obtained from various types of waveforms, including but not limited to FMCW and OFDM, as inputs for a NN to classify sensing targets/objects.

Figure 6:
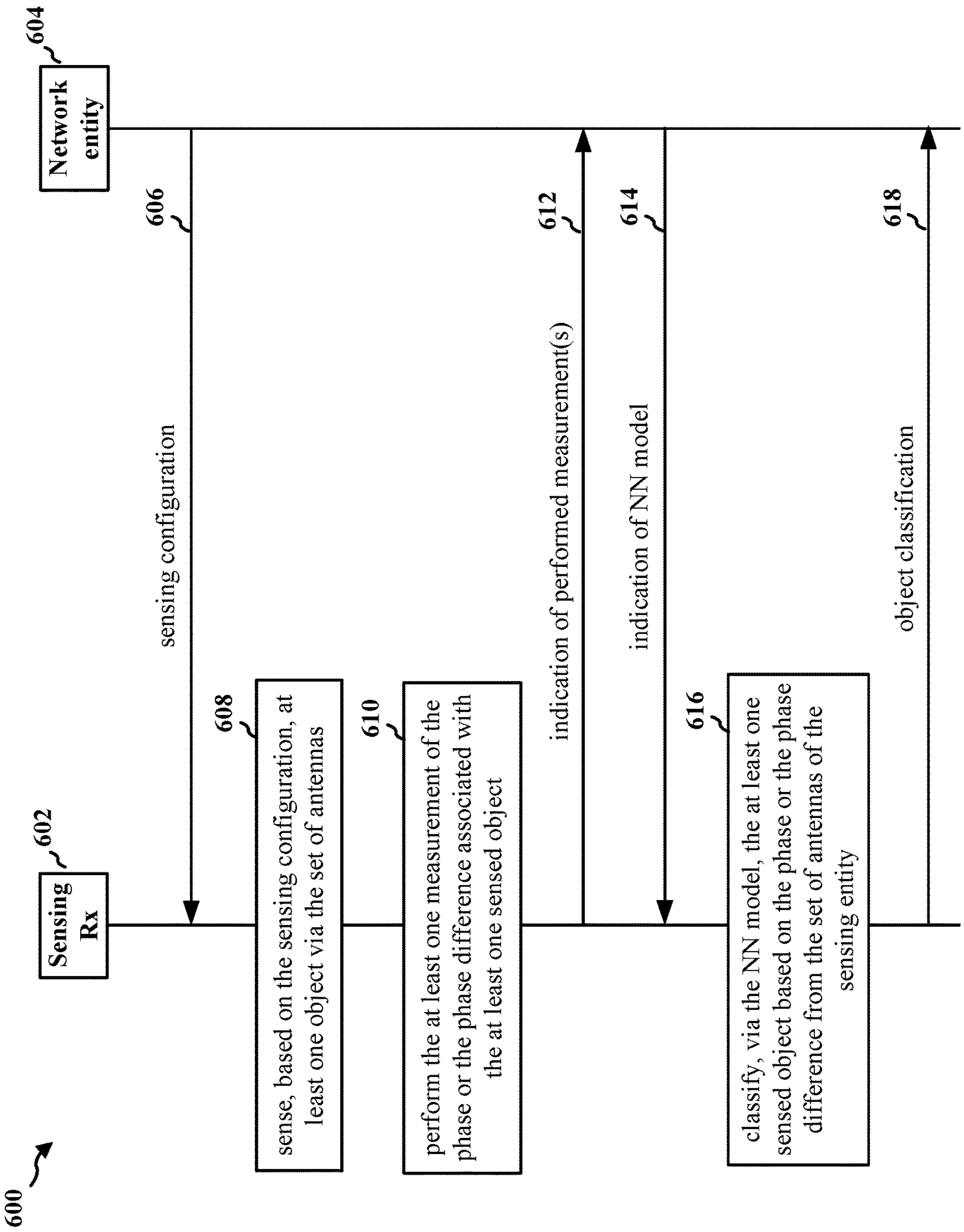
FIG. 6 is a call flow diagram for wireless communications, in accordance with various aspects of the present disclosure.

FIG. 6 is a call flow diagram 600 for wireless communications, in various aspects. Call flow diagram 600 illustrates phase difference based object classification in sensing by a sensing entity (e.g., a sensing entity 602 (such as a UE, a network node such as a base station/gNB, etc.)) that may communicate with a network entity (e.g., a network entity 604 (such as a sensing server (e.g., of a core network), a base station/gNB or other type of base station, by way of example)). Aspects described for the network entity 604 may be performed in aggregated form and/or by one or more components of the network entity 604 in disaggregated form. Additionally, or alternatively, the aspects may be performed by the sensing entity 602 autonomously, in addition to, and/or in lieu of, operations of the network entity 604. In aspects, where the sensing entity 602 is a UE, communications to and/or from the network entity 604 may be performed via a base station.

In the illustrated aspect, the sensing entity 602 may be configured to receive, from (transmitted/provided by) the network entity 604, a sensing configuration 606. The sensing configuration 606 may be a configuration by which the sensing entity is configured to perform sensing operations on a sensing target/object, and may indicate at least one measurement of a phase (e.g., a shape, a position, and/or a form of a returned sensing signal) or a phase difference (e.g., a difference between two phases) for classification of objects in sensing operations. The at least one measurement may be associated with a set of antennas of the sensing entity 602. In aspects, the set of antennas may include at least two antennas of a uniform linear array (e.g., as described with respect to FIG. 5), and the phase difference associated with the at least one sensed object may be based on at least one difference between the at least one measurement of the phase for the at least two antennas of the uniform linear array. In aspects, the sensing configuration 606 may include, or may be associated with (as provided/transmitted by the network entity 604 to the sensing entity 602) a crowdsourcing indication that indicates a sensing identifier of the sensing entity 602 and target information. The target information may include at least one of a range, an angle, a speed, a location, or a target identifier of the at least one object, and the crowdsourcing indication may be provided/transmitted to at least one additional sensing entity, as described in further detail below.

The sensing entity 602 may be configured to sense (at 608), based on the sensing configuration 606, at least one object via the set of antennas. In aspects, the sensing entity 602 may be configured to sense (at 608) sensing targets/objects via monostatic sensing or via bistatic sensing (e.g., with a UE and/or a base station, gNB, etc.).

The sensing entity 602 may be configured to perform (at 610) the at least one measurement of the phase or the phase difference associated with the at least one sensed object. The sensing entity 602 may be configured to perform (at 610) the at least one measurement of the phase or the phase difference based on the crowdsourcing indication, described above and in further detail below.

The sensing entity 602 may be configured to provide, for the network entity 604 and based on the sensing configuration 606, an indication 612 of the at least one performed measurement of the phase or the phase difference. The indication 612 of the at least one performed measurement of the phase or the phase difference may include indicia of monostatic sensing or bistatic sensing (e.g., for 608). The indication 612 of the at least one performed measurement of the phase or the phase difference may indicate, in aspects, at least one of the sensing identifier, the target identifier, a time stamp associated with the at least one measurement of the phase or the phase difference, or an antenna index of the sensing entity 602.

The network entity 604 may be configured to transmit/provide, and the sensing entity 602 may be configured to receive, an indication of a NN model 614. In aspects, the NN model 614 may be trained by the network entity 604 based on training data (e.g., associated with prior sensing measurements for phases/phase differences). In aspects, the NN model 614 may be based on machine learning or ML training associated with the at least one measurement of the phase or the phase difference of the indication 612. For instance, when one moving target is considered for sensing, and it is not spinning or rotating, the phase difference of the signals received between the adjacent antenna element may be constant. As one example, when a vehicle is traveling on a road, the vehicle body(ies) may not spin or rotate, etc. However, if the target is moving and parts of it are moving separately (e.g., wheels of a vehicle are rotating), many signals with different phases, which are generated due to the micro-Doppler effect, may be detected in the Rx (e.g., the sensing entity 602).

As another example, when a pedestrian is walking, in addition to the bulk translation of the body of the pedestrian, their legs and arms periodically rotate. In the vehicle context, when the vehicle is traveling on the road, the wheels may rotate, as noted above. Therefore, a deep neural network may be utilized as a classifier, and the phase, $$\Phi^{u}_{m,l},$$

and/or the phase difference, $$\Delta\Phi^{u}_{m,l},$$

of the received signals may be used as inputs to the NN. In the context of the pedestrian object case, the phase and/or phase difference may not overlap, and the non-coherent phases may be found. In the context of the vehicle object case, the phase and/or phase difference may be similar, or their shape may be similar. The variance of the phase difference between the signals reflected from a pedestrian and/or a vehicle may also be used to differentiate pedestrian objects and vehicle objects.

The sensing entity 602 may be configured to classify (at 616), via the NN model 614, the at least one sensed object based on the phase or the phase difference from the set of antennas of the sensing entity 602. In aspects, the sensing entity 602 may be configured to classify (at 616), via the NN model 614, the at least one sensed object based on a variance of the phase difference. That is, the network entity 604 may be configured to generate the NN model 614 to infer the classification of the objects based on the variance in the at least one measurement of the phase difference. Such classification (at 616) may indicate an object(s) as pedestrians, vehicles, and/or any other type of object, such as objects that move in various manners.

The sensing entity 602 may be configured to transmit/provide, and the network entity 604 may be configured to receive, an object classification 618 that may be based on the classification (e.g., at 616) of the at least one sensed object. The network entity 604 may utilize the object classification 618 to verify such classifications, to train/retrain the NN model 614, and/or the like.

Figure 7:
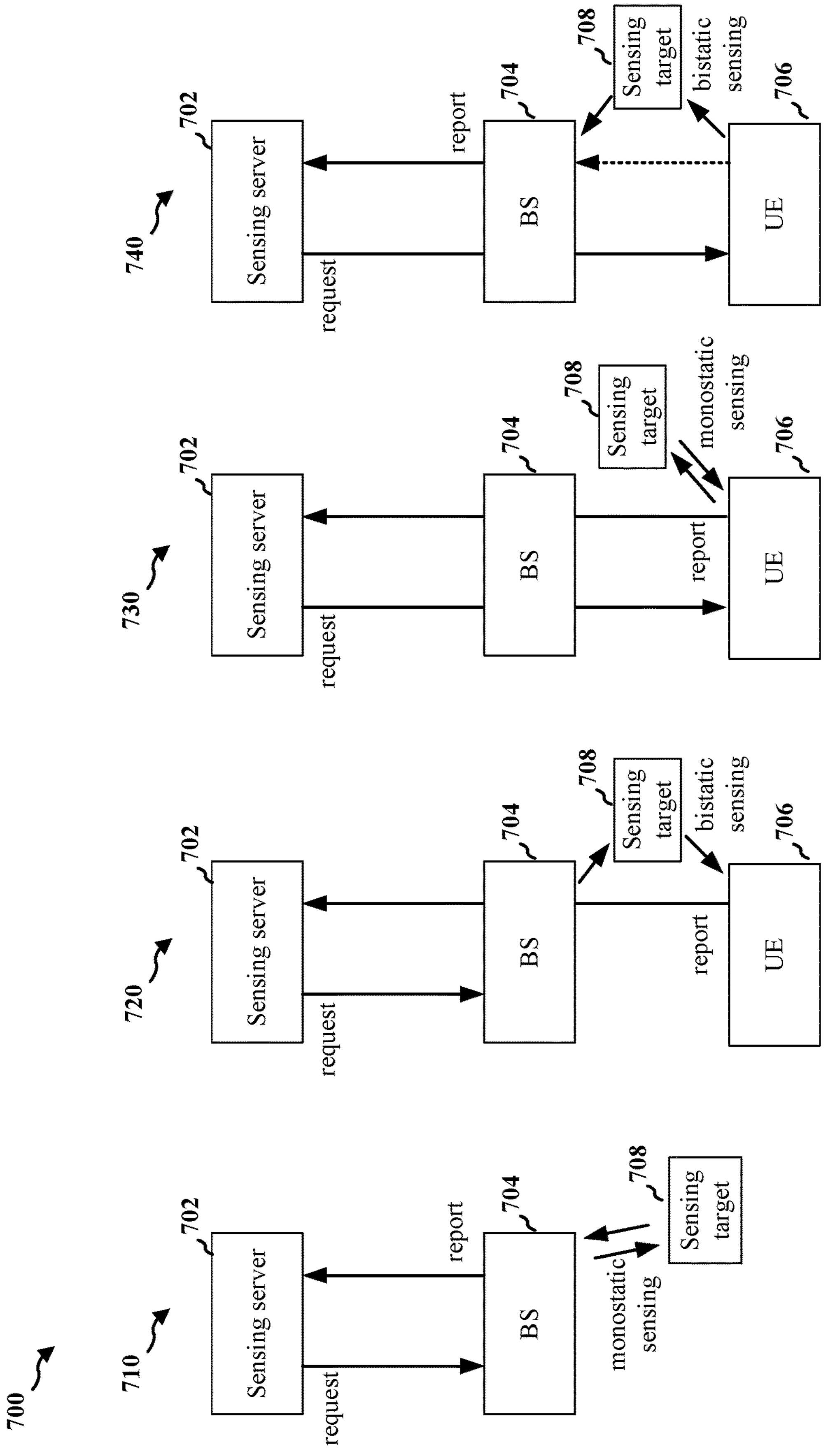
FIG. 7 is a diagram illustrating examples of phase measurement reporting for sensing object classification, in accordance with various aspects of the present disclosure.

FIG. 7 is a diagram 700 illustrating examples of phase measurement reporting for sensing object classification, in various aspects. Diagram 700 shows various configurations (a configuration 710, a configuration 720, a configuration 730, and a configuration 740) with combinations of a sensing server 702, a base station 704, a UE 706, and a sensing target 708 (or object) to illustrate aspects of phase difference based object classification in sensing. In aspects, the base station 704 and/or the UE 706 may be a sensing entity, and the base station 704 and/or the sensing server 702 may be a network entity, as described elsewhere herein.

For phase measurement reporting (e.g., via the indication 612 of the at least one performed measurement of the phase or the phase difference, in FIG. 6), the sensing Rx (e.g., the base station 704 and/or the UE 706) may be indicated to send the phase measurement report to the sensing server 702 for sensing object classification. The phase measurement report may include the phase, $$\Phi^{u}_{m,l},$$

and/or the phase difference, $$\Delta\Phi^{u}_{m,l},$$

of the received signals from a multiple-antenna (antenna-array) receiver. In aspects, the phase measurement may be dependent on monostatic sensing or bistatic sensing.

In the configuration 710, the sensing server 702 may request to the base station 704 that an object classification report be provided. The base station 704 may be configured to sense (e.g., via monostatic sensing) the sensing target 708 (or object) based on a sensing configuration (e.g., as for 606 in FIG. 6) via a set of antennas of the base station 704. The base station 704 may be further configured to perform (e.g., as at 610 in FIG. 6) the at least one measurement of the phase or the phase difference associated with the sensing target 708, and to provide/transmit, e.g., as the report, indicia of the performed measurement of the phase or the phase difference to the sensing server 702. The report (e.g., the indication 612 in FIG. 6) of the at least one performed measurement of the phase or the phase difference may also include indicia of monostatic sensing being utilized.

In the configuration 720, the sensing server 702 may request to the base station 704 that an object classification report be provided. The base station 704 may be configured to sense (e.g., via bistatic sensing with the UE 706) the sensing target 708 (or object) based on a sensing configuration (e.g., as for 606 in FIG. 6) via a set of antennas of the base station 704 and of the UE 706. The base station 704 and/or the UE 706 may be further configured to perform (e.g., as at 610 in FIG. 6) the at least one measurement of the phase or the phase difference associated with the sensing target 708, and to provide/transmit, e.g., as the report, indicia of the performed measurement of the phase or the phase difference to the sensing server 702. The report (e.g., the indication 612 in FIG. 6) of the at least one performed measurement of the phase or the phase difference may also include indicia of bistatic sensing being utilized.

In the configuration 730, the sensing server 702 may request to the UE 706 that an object classification report be provided. The UE 706 may be configured to sense (e.g., via monostatic sensing) the sensing target 708 (or object) based on a sensing configuration (e.g., as for 606 in FIG. 6) via a set of antennas of the UE 706. The UE 706 may be further configured to perform (e.g., as at 610 in FIG. 6) the at least one measurement of the phase or the phase difference associated with the sensing target 708, and to provide/transmit, e.g., as the report, indicia of the performed measurement of the phase or the phase difference to the sensing server 702. The report (e.g., the indication 612 in FIG. 6) of the at least one performed measurement of the phase or the phase difference may also include indicia of monostatic sensing being utilized.

In the configuration 740, the sensing server 702 may request to the UE 706 that an object classification report be provided. The UE 706 may be configured to sense (e.g., via bistatic sensing with the base station 704) the sensing target 708 (or object) based on a sensing configuration (e.g., as for 606 in FIG. 6) via a set of antennas of the base station 704 and of the UE 706. The base station 704 and/or the UE 706 may be further configured to perform (e.g., as at 610 in FIG. 6) the at least one measurement of the phase or the phase difference associated with the sensing target 708, and to provide/transmit, e.g., as the report, indicia of the performed measurement of the phase or the phase difference to the sensing server 702. The report (e.g., the indication 612 in FIG. 6) of the at least one performed measurement of the phase or the phase difference may also include indicia of bistatic sensing being utilized.

Figure 8:
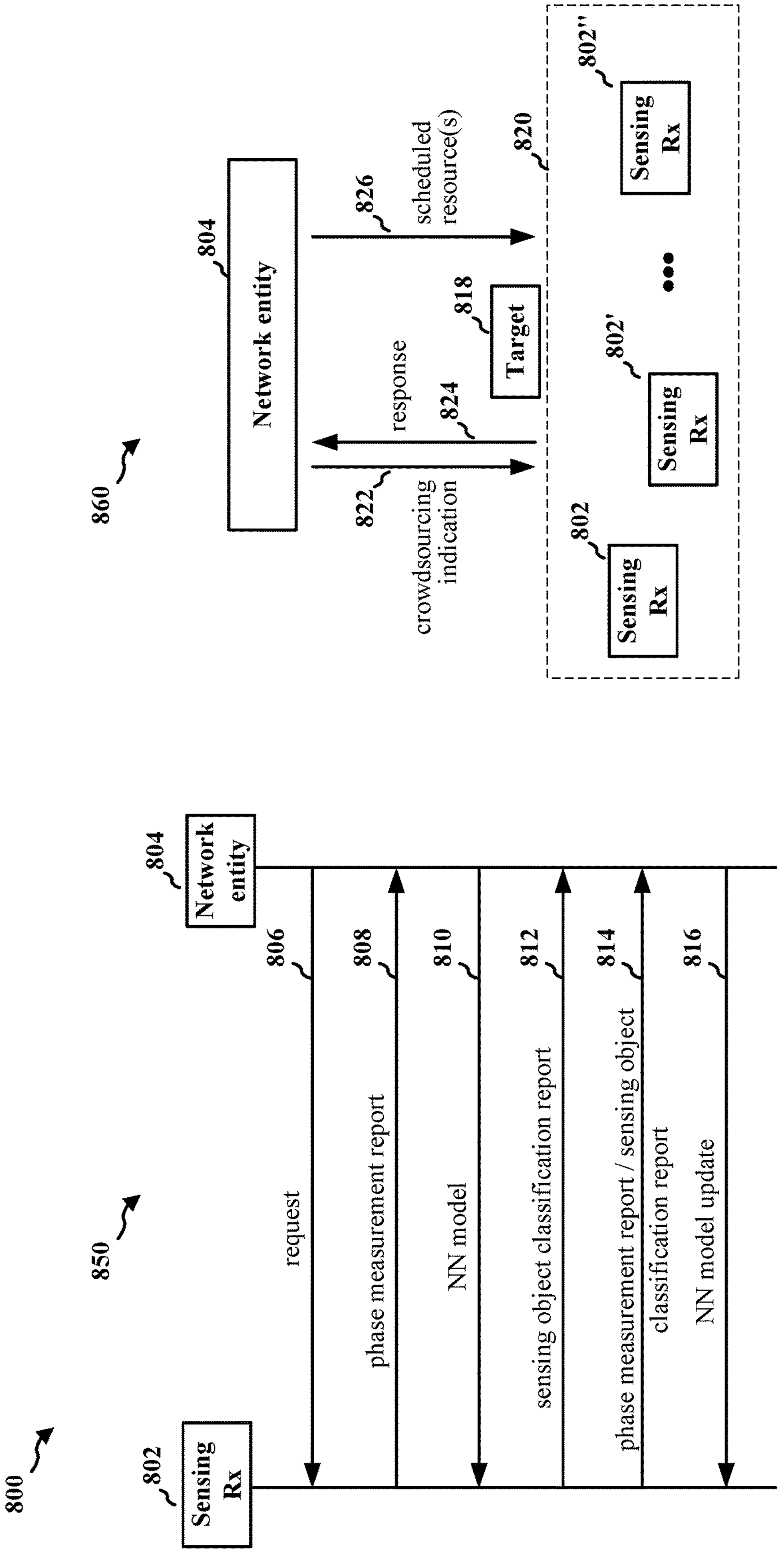
FIG. 8 shows a call flow diagram for wireless communications and crowdsourcing configuration for phase measurement reporting for sensing object classification, in accordance with various aspects of the present disclosure.

FIG. 8 shows a diagram 800 having a call flow diagram 850 for wireless communications and a crowdsourcing configuration 860 for phase measurement reporting for sensing object classification, in various aspects.

The call flow diagram 850 provides an example of NN model communications and updates and is illustrated for wireless communications between a sensing entity 802 (e.g., a sensing Rx) and a network entity 804.

The network entity 804 may provide to the sensing entity 802 a request 806 for a phase measurement report 808. The sensing entity 802 may provide to the network entity 804, e.g., based on the request 806, the phase measurement report 808 that may include at least one measurement of a phase or a phase difference for a sensing target (object), as described herein. The network entity 804 may perform ML training for a NN model 810 based on the received phase measurement report from the sensing entity 802 to classify the sensing target (object).

The sensing entity 802 may receive the NN model 810 for inference from the network entity 804 after the network entity 804 performs the ML training for the NN model 810. The sensing entity 802 may thus be indicated to perform sensing object classification based on the NN model 810, and then send a sensing object classification report 812 to the network entity 804. In aspects, the sensing entity 802 may also be indicated to send a combined report 814 including both the phase measurement report 808 and the sensing object classification report 812 for a period of time to the network entity 804 for an update 816 of the NN model 810. The network entity 804 may provide the update 816 of the NN model 810 to the sensing entity 802 for further, or subsequent, performance of classification(s).

The crowdsourcing configuration 860 for phase measurement reporting for sensing object classification is between a set of sensing entities 820 (e.g., sensing Rx's), shown by way of example as the sensing entity 802, a sensing entity 802', . . . , and a sensing entity 802", and the network entity 804. In the illustrated aspect, the sensing entity 802 may have previously sensed a sensing target 818 for phase measurement reporting.

When a sensing entity or node in the set of sensing entities 820 (e.g., a UE or a base station, gNB, etc., such as the sensing entity 802) reports different phases $$\left(\text{e.g., } \Phi^{u}_{m,l}\right)$$

and/or phase differences $$\left(\text{e.g., } \Delta\Phi^{u}_{m,l}\right)$$

across antennas of its set of antennas to the network entity 804 (e.g., a sensing server), the network entity 804 may initiate a specific data collection session, referred to herein as "crowdsourcing." The network entity 804 may provide, e.g., page, multicast, groupcast, broadcast, and/or unicast to two or more of the set of sensing entities 820 that are geographically close to the sensing target 818 associated with the phase measurements $$\left(\text{e.g., the different } \Phi^{u}_{m,l} \text{ and/or } \Delta\Phi^{u}_{m,l}\right).$$

In aspects, the network entity 804 may allocate a target identifier (ID) and provide a request (e.g., a crowdsourcing indication 822) to the set of sensing entities 820 for assistance data regarding the associated target information, such as a range, a speed, an angle, a location, a target ID, and/or the like.

The sensing entities of the set of sensing entities 820 may each provide, for the network entity 804, a response to the crowdsourcing indication 822. That is, the ones of the set of sensing entities 820 that are able, or not, to participate in the crowdsourcing measurements may respond quickly to the on-demand request of the crowdsourcing indication 822 so that the network entity 804 may schedule a resource(s) 826 for the $$\Phi^{u}_{m,l} \text{ and/or } \Delta\Phi^{u}_{m,l}$$

measurements and reports for the sensing entities of the set of sensing entities 820. The sensing entities of the set of sensing entities 820 may receive, from the network entity 804, at least one scheduled resource 824 for the at least one measurement of the phase or the phase difference.

Participating sensing entities of the set of sensing entities 820 for the crowdsourcing operation may sense the sensing target 818 and perform the at least one measurement of the phase or the phase difference associated with the sensing target 818 based on the at least one scheduled resource 824, as described herein (e.g., with respect to the call flow diagram 600 in FIG. 6). The reported $$\Phi^{u}_{m,l} \text{ and/or } \Delta\Phi^{u}_{m,l}$$

of the participating sensing entities of the set of sensing entities 820 may be associated with an ID, a target ID, a time stamp, an antenna index, and/or the like, for the respective sensing entities (e.g., the sensing entity 802, the sensing entity 802', . . . , and the sensing entity 802") of the set of sensing entities 820.

In aspects, reported results of crowdsourcing operations may be utilized by the network entity 804 to perform classification of sensing targets/objects and/or to perform ML training or retraining for NN models, as described herein.

Figure 9:
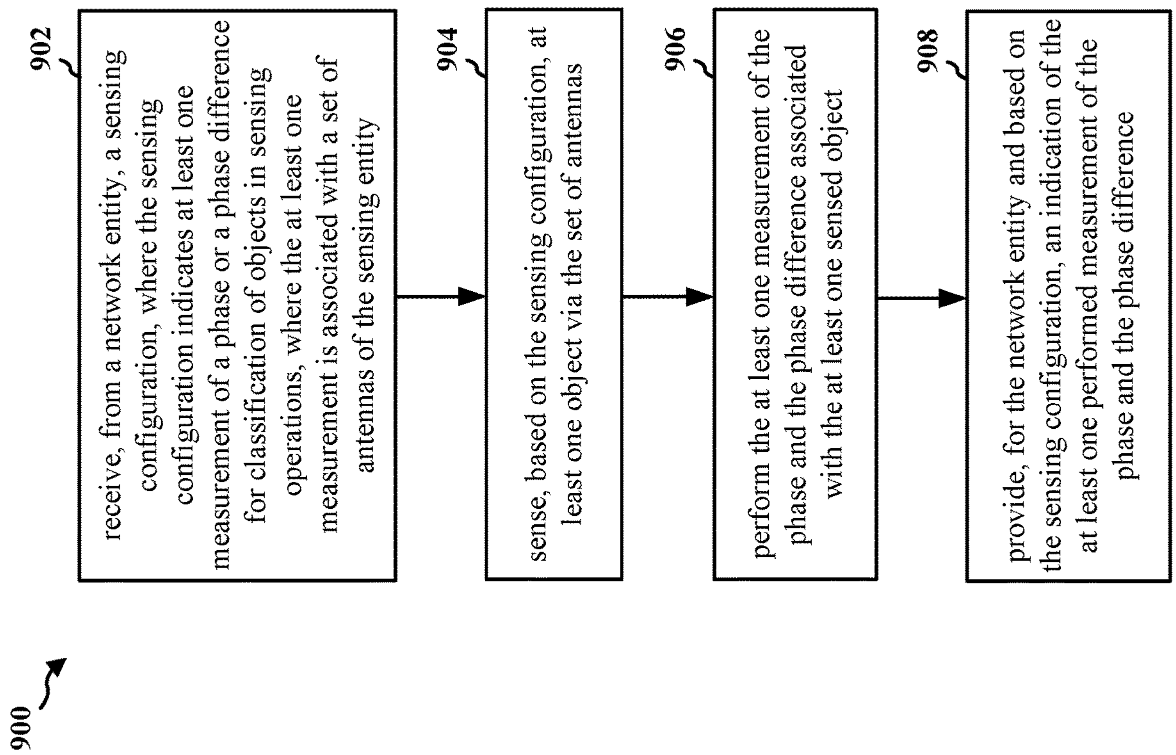
FIG. 9 is a flowchart of a method of wireless communication, in accordance with various aspects of the present disclosure.

FIG. 9 is a flowchart 900 of a method of wireless communication. The method may be performed by a sensing entity, such as but not limited to, a UE or a base station (e.g., the UE 104, 404, 706; the sensing entity 602, 802, 802', 802"; the apparatus 1304; the base station 102, 704; the network entity 1302, 1402). In some aspects, the method may include aspects described in connection with the communication flow in FIG. 6 and/or aspects described in FIGS. 7 and 8. The method provides for phase difference based object classification in sensing that enables a sensing entity to utilize the phases and phase differences of received signals from multiple antennas of a sensing entity for sensing target/object classification assisted by NN models. The method provides for determinations of variances in motions via Doppler and/or micro-Doppler effects for NN training by obtaining phase and phase difference measurements of sensing targets, provide for improved sensing target classifications, e.g., types of objects/targets, by training and utilizing a NN model based on the phase and phase difference measurements, and provide for further improved sensing target classifications and ML training of NN models by performing crowdsourcing operations for phase and phase difference measurements, e.g., based on differing measurements across antennas of a sensing entity.

At 902, the sensing entity receives, from a network entity, a sensing configuration, where the sensing configuration indicates at least one measurement of a phase or a phase difference for classification of objects in sensing operations, where the at least one measurement is associated with a set of antennas of the sensing entity. As an example, the reception may be performed, at least in part, by the component 198. FIGS. 6-8 illustrate an example of the sensing entity 602 receiving such a sensing configuration from a network entity (e.g., the network entity 604).

The sensing entity 602 may be configured to receive, from (transmitted/provided by) the network entity 604, a sensing configuration 606. The sensing configuration 606 may indicate at least one measurement of a phase or a phase difference for classification of objects in sensing operations. The at least one measurement may be associated with a set of antennas of the sensing entity 602. In aspects, the set of antennas may include at least two antennas of a uniform linear array (e.g., as described with respect to FIG. 5), and the phase difference associated with the at least one sensed object may be based on at least one difference between the at least one measurement of the phase for the at least two antennas of the uniform linear array. In aspects, the sensing configuration 606 may include, or may be associated with (as provided/transmitted by the network entity 604 to the sensing entity 602) a crowdsourcing indication that indicates a sensing identifier of the sensing entity 602 and target information. The target information may include at least one of a range, an angle, a speed, a location, or a target identifier of the at least one object, and the crowdsourcing indication may be provided/transmitted to at least one additional sensing entity.

At 904, the sensing entity senses, based on the sensing configuration, at least one object via the set of antennas. As an example, the sensing may be performed, at least in part, by the component 198. FIGS. 6-8 illustrate an example of the sensing entity 602 sensing such an object(s).

The sensing entity 602 may be configured to sense (at 608), based on the sensing configuration 606, at least one object via the set of antennas. In aspects, the sensing entity 602 may be configured to sense (at 608) sensing targets/objects via monostatic sensing or via bistatic sensing (e.g., with a UE and/or a base station, gNB, etc.).

At 906, the sensing entity performs the at least one measurement of the phase or the phase difference associated with the at least one sensed object. As an example, the performance of measurements may be accomplished, at least in part, by the component 198. FIGS. 6-8 illustrate an example of the sensing entity 602 performing such measurements for the phase or the phase difference associated with sensed objects.

The sensing entity 602 may be configured to perform (at 610) the at least one measurement of the phase or the phase difference associated with the at least one sensed object. The sensing entity 602 may be configured to perform (at 610) the at least one measurement of the phase or the phase difference based on the crowdsourcing indication.

At 908, the sensing entity provides, for the network entity and based on the sensing configuration, an indication of the at least one performed measurement of the phase or the phase difference. As an example, the provision may be performed, at least in part, by the component 198. FIGS. 6-8 illustrate an example of the sensing entity 602 providing such an indication for a network entity (e.g., the network entity 604).

The sensing entity 602 may be configured to provide, for the network entity 604 and based on the sensing configuration 606, an indication 612 of the at least one performed measurement of the phase or the phase difference. The indication 612 of the at least one performed measurement of the phase or the phase difference may include indicia of monostatic sensing or bistatic sensing (e.g., for 608). The indication 612 of the at least one performed measurement of the phase or the phase difference may indicate, in aspects, at least one of the sensing identifier, the target identifier, a time stamp associated with the at least one measurement of the phase or the phase difference, or an antenna index of the sensing entity 602.

Figure 10:
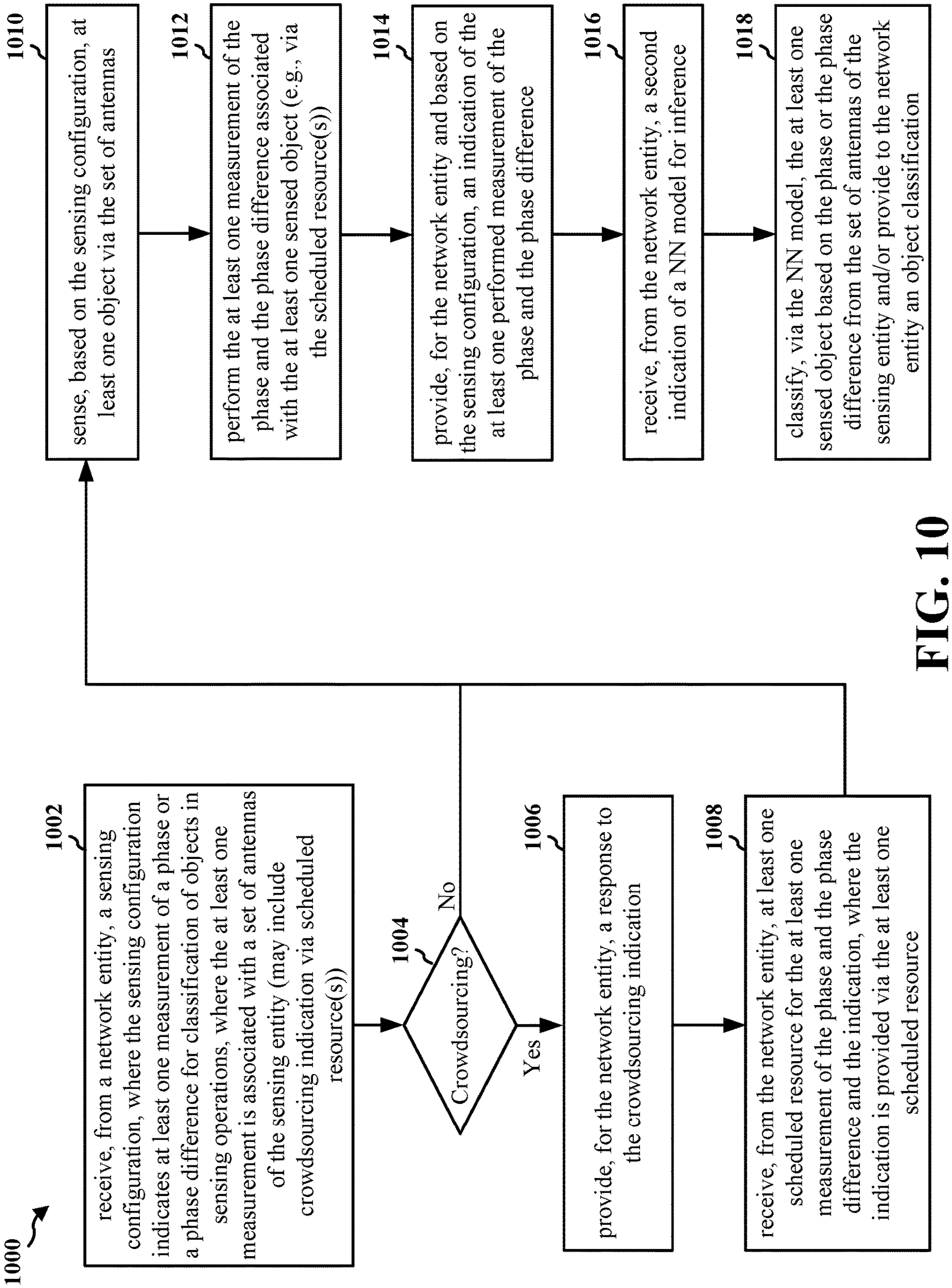
FIG. 10 is a flowchart of a method of wireless communication, in accordance with various aspects of the present disclosure.

FIG. 10 is a flowchart 1000 of a method of wireless communication, in accordance with various aspects of the present disclosure. The method may be performed by a sensing entity, such as but not limited to, a UE or a base station (e.g., the UE 104, 404, 706; the sensing entity 602, 802, 802', 802"; the apparatus 1304; the base station 102, 704; the network entity 1302, 1402). In some aspects, the method may include aspects described in connection with the communication flow in FIG. 6 and/or aspects described in FIGS. 7 and 8. The method provides for phase difference based object classification in sensing that enables a sensing entity to utilize the phases and phase differences of received signals from multiple antennas of a sensing entity for sensing target/object classification assisted by NN models. The method provides for determinations of variances in motions via Doppler and/or micro-Doppler effects for NN training by obtaining phase and phase difference measurements of sensing targets, provide for improved sensing target classifications, e.g., types of objects/targets, by training and utilizing a NN model based on the phase and phase difference measurements, and provide for further improved sensing target classifications and ML training of NN models by performing crowdsourcing operations for phase and phase difference measurements, e.g., based on differing measurements across antennas of a sensing entity.

At 1002, the sensing entity receives, from a network entity, a sensing configuration, where the sensing configuration indicates at least one measurement of a phase or a phase difference for classification of objects in sensing operations, where the at least one measurement is associated with a set of antennas of the sensing entity. As an example, the reception may be performed, at least in part, by the component 198. FIGS. 6-8 illustrate an example of the sensing entity 602 receiving such a sensing configuration from a network entity (e.g., the network entity 604).

The sensing entity 602 may be configured to receive, from (transmitted/provided by) the network entity 604, a sensing configuration 606. The sensing configuration 606 may indicate at least one measurement of a phase or a phase difference for classification of objects in sensing operations. The at least one measurement may be associated with a set of antennas of the sensing entity 602. In aspects, the set of antennas may include at least two antennas of a uniform linear array (e.g., as described with respect to FIG. 5), and the phase difference associated with the at least one sensed object may be based on at least one difference between the at least one measurement of the phase for the at least two antennas of the uniform linear array. In aspects, the sensing configuration 606 may include, or may be associated with (as provided/transmitted by the network entity 604 to the sensing entity 602) a crowdsourcing indication that indicates a sensing identifier of the sensing entity 602 and target information. The target information may include at least one of a range, an angle, a speed, a location, or a target identifier of the at least one object, and the crowdsourcing indication may be provided/transmitted to at least one additional sensing entity.

At 1004, it is determined if a crowdsourcing operation is to be performed. As an example, the reception may be performed, at least in part, by the component 198. For instance, a crowdsourcing indication associated with the sensing configuration 606 may be received by the sensing entity 602 from the network entity 604. If a crowdsourcing operation is to be performed, flowchart 1000 continues to 1006; if not, flowchart 1000 continues to 1010.

At 1006, the sensing entity provides, for the network entity, a response to the crowdsourcing indication. As an example, the provision may be performed, at least in part, by the component 198. FIGS. 6-8 illustrate an example of the sensing entity 802 (e.g., 602 in FIG. 6) providing such a response for a network entity (e.g., the network entity 804 (e.g., 604 in FIG. 6)).

When a sensing entity or node in the set of sensing entities 820 (e.g., a UE or a base station, gNB, etc., such as the sensing entity 802) reports different phases $$\left(\text{e.g., } \Phi^{u}_{m,l}\right)$$

and/or phase differences $$\left(\text{e.g., } \Delta\Phi^{u}_{m,l}\right)$$

across antennas of its set of antennas to the network entity 804 (e.g., a sensing server), the network entity 804 may initiate a specific data collection session, referred to herein as "crowdsourcing." The network entity 804 may provide, e.g., page, multicast, groupcast, broadcast, and/or unicast to two or more of the set of sensing entities 820 that are geographically close to the sensing target 818 associated with the phase measurements $$\left(\text{e.g., the different } \Phi^{u}_{m,l} \text{ and/or } \Delta\Phi^{u}_{m,l}\right).$$

In aspects, the network entity 804 may allocate a target identifier (ID) and provide a request (e.g., a crowdsourcing indication 822) to the set of sensing entities 820 for assistance data regarding the associated target information, such as a range, a speed, an angle, a location, a target ID, and/or the like.

The sensing entities of the set of sensing entities 820 may each provide, for the network entity 804, a response to the crowdsourcing indication 822. That is, the ones of the set of sensing entities 820 that are able, or not, to participate in the crowdsourcing measurements may respond quickly to the on-demand request of the crowdsourcing indication 822 so that the network entity 804 may schedule a resource(s) 826 for the $$\Phi^{u}_{m,l} \text{ and/or } \Delta\Phi^{u}_{m,l}$$

measurements and reports for the sensing entities of the set of sensing entities 820.

At 1008, the sensing entity receives, from the network entity, at least one scheduled resource for the at least one measurement of the phase and the phase difference and the indication, where the indication is provided via the at least one scheduled resource. As an example, the reception may be performed, at least in part, by the component 198. FIGS. 6-8 illustrate an example of the sensing entity 602 receiving such a scheduled resource(s) from a network entity (e.g., the network entity 604).

The sensing entities of the set of sensing entities 820 may receive, from the network entity 804, at least one scheduled resource 824 for the at least one measurement of the phase or the phase difference. Participating sensing entities of the set of sensing entities 820 for the crowdsourcing operation may sense the sensing target 818 and perform the at least one measurement of the phase or the phase difference associated with the sensing target 818 based on the at least one scheduled resource 824, as described herein (e.g., with respect to the call flow diagram 600 in FIG. 6). The reported $$\Phi^{u}_{m,l} \text{ and/or } \Delta\Phi^{u}_{m,l}$$

of the participating sensing entities of the set of sensing entities 820 may be associated with an ID, a target ID, a time stamp, an antenna index, and/or the like, for the respective sensing entities (e.g., the sensing entity 802, the sensing entity 802', . . . , and the sensing entity 802") of the set of sensing entities 820. In aspects, reported results of crowdsourcing operations may be utilized by the network entity 804 to perform classification of sensing targets/objects and/or to perform ML training or retraining for NN models, as described herein.

At 1010, the sensing entity senses, based on the sensing configuration, at least one object via the set of antennas. As an example, the sensing may be performed, at least in part, by the component 198. FIGS. 6-8 illustrate an example of the sensing entity 802 (e.g., also 602 in FIG. 6) sensing such an object(s).

The sensing entity 602 may be configured to sense (at 608), based on the sensing configuration 606, at least one object via the set of antennas. In aspects, the sensing entity 602 may be configured to sense (at 608) sensing targets/objects via monostatic sensing or via bistatic sensing (e.g., with a UE and/or a base station, gNB, etc.).

At 1012, the sensing entity performs the at least one measurement of the phase and the phase difference associated with the at least one sensed object (e.g., via the scheduled resource(s)). As an example, the performance may be accomplished, at least in part, by the component 198. FIGS. 6-8 illustrate an example of the sensing entity 602 performing such measurements.

The sensing entity 602 may be configured to perform (at 610) the at least one measurement of the phase or the phase difference associated with the at least one sensed object. The sensing entity 602 may be configured to perform (at 610) the at least one measurement of the phase or the phase difference based on the crowdsourcing indication.

At 1014, the sensing entity provides, for the network entity and based on the sensing configuration, an indication of the at least one performed measurement of the phase and the phase difference. As an example, the provision may be performed, at least in part, by the component 198. FIGS. 6-8 illustrate an example of the sensing entity 602 providing such an indication for a network entity (e.g., the network entity 604).

The sensing entity 602 may be configured to provide, for the network entity 604 and based on the sensing configuration 606, an indication 612 of the at least one performed measurement of the phase or the phase difference. The indication 612 of the at least one performed measurement of the phase or the phase difference may include indicia of monostatic sensing or bistatic sensing (e.g., for 608). The indication 612 of the at least one performed measurement of the phase or the phase difference may indicate, in aspects, at least one of the sensing identifier, the target identifier, a time stamp associated with the at least one measurement of the phase or the phase difference, or an antenna index of the sensing entity 602.

At 1016, the sensing entity receives, from the network entity, a second indication of a NN model for inference. As an example, the reception may be performed, at least in part, by the component 198. FIGS. 6-8 illustrate an example of the sensing entity 602 receiving such an indication of a NN model for inference from a network entity (e.g., the network entity 604).

The network entity 604 may be configured to transmit/provide, and the sensing entity 602 may be configured to receive, an indication of a NN model 614. In aspects, the NN model 614 may be trained by the network entity 604 based on training data (e.g., associated with prior sensing measurements for phases/phase differences). In aspects, the NN model 614 may be based on machine learning or ML training associated with the at least one measurement of the phase or the phase difference of the indication 612. For instance, when one moving target is considered for sensing, and it is not spinning or rotating, the phase difference of the signals received between the adjacent antenna element may be constant. As one example, when a vehicle is traveling on a road, the vehicle body(ies) may not spin or rotate, etc. However, if the target is moving and parts of it are moving separately (e.g., wheels of a vehicle are rotating), many signals with different phases, which are generated due to the micro-Doppler effect, may be detected in the Rx (e.g., the sensing entity 602).

As another example, when a pedestrian is walking, in addition to the bulk translation of the body of the pedestrian, their legs and arms periodically rotate. In the vehicle context, when the vehicle is traveling on the road, the wheels may rotate, as noted above. Therefore, a deep neural network may be utilized as a classifier, and the phase, $$\Phi^{u}_{m,l},$$

and/or the phase difference, $$\Delta\Phi^{u}_{m,l},$$

of the received signals may be used as inputs to the NN. In the context of the pedestrian object case, the phase and/or phase difference may not overlap, and the non-coherent phases may be found. In the context of the vehicle object case, the phase and/or phase difference may be similar, or their shape may be similar. The variance of the phase difference between the signals reflected from a pedestrian and/or a vehicle may also be used to differentiate pedestrian objects and vehicle objects.

At 1018, the sensing entity classifies, via the NN model, the at least one sensed object based on the phase and/or the phase difference from the set of antennas of the sensing entity and/or provide to the network entity an object classification. As an example, the classification may be performed, at least in part, by the component 198. FIGS. 6-8 illustrate an example of the sensing entity 602 performing such a classification.

The sensing entity 602 may be configured to classify (at 616), via the NN model 614, the at least one sensed object based on the phase or the phase difference from the set of antennas of the sensing entity 602. In aspects, the sensing entity 602 may be configured to classify (at 616), via the NN model 614, the at least one sensed object based on a variance of the phase difference. That is, the network entity 604 may be configured to generate the NN model 614 to infer the classification of the objects based on the variance in the at least one measurement of the phase difference. Such classification (at 616) may indicate an object(s) as pedestrians, vehicles, and/or any other type of object, such as objects that move in various manners. The sensing entity 602 may be configured to transmit/provide, and the network entity 604 may be configured to receive, an object classification 618 that may be based on the classification (e.g., at 616) of the at least one sensed object. The network entity 604 may utilize the object classification 618 to verify such classifications, to train/retrain the NN model 614, and/or the like.

Figure 11:
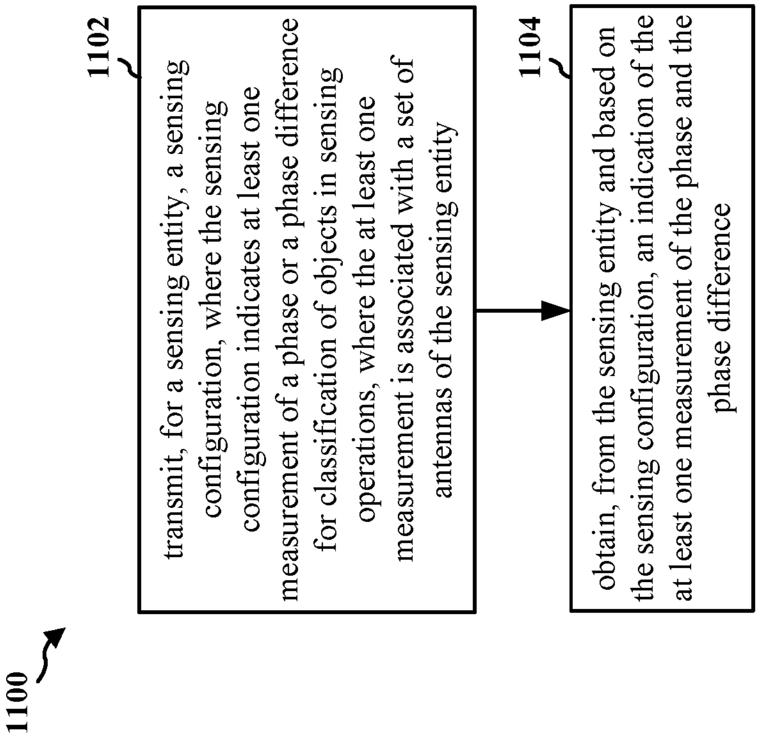
FIG. 11 is a flowchart of a method of wireless communication, in accordance with various aspects of the present disclosure.

FIG. 11 is a flowchart 1100 of a method of wireless communication, in accordance with various aspects of the present disclosure. The method may be performed by a network entity and/or a network node (e.g., the base station 102, 704; the sensing server 702; the network entity 604, 804, 1302, 1402, 1560). The method provides for phase difference based object classification in sensing that enables a sensing entity to utilize the phases and phase differences of received signals from multiple antennas of a sensing entity for sensing target/object classification assisted by NN models. The method provides for determinations of variances in motions via Doppler and/or micro-Doppler effects for NN training by obtaining phase and phase difference measurements of sensing targets, provide for improved sensing target classifications, e.g., types of objects/targets, by training and utilizing a NN model based on the phase and phase difference measurements, and provide for further improved sensing target classifications and ML training of NN models by performing crowdsourcing operations for phase and phase difference measurements, e.g., based on differing measurements across antennas of a sensing entity.

At 1102, the network entity transmits, for a sensing entity, a sensing configuration, where the sensing configuration indicates at least one measurement of a phase or a phase difference for classification of objects in sensing operations, where the at least one measurement is associated with a set of antennas of the sensing entity. As an example, the transmission/provision may be performed, at least in part, by the component 199. FIGS. 6-8 illustrate an example of the network entity 604 transmitting/providing such a sensing configuration for a sensing entity (e.g., the sensing entity 602).

The sensing entity 602 may be configured to receive, from (transmitted/provided by) the network entity 604, a sensing configuration 606. The sensing configuration 606 may indicate at least one measurement of a phase or a phase difference for classification of objects in sensing operations. The at least one measurement may be associated with a set of antennas of the sensing entity 602. In aspects, the set of antennas may include at least two antennas of a uniform linear array (e.g., as described with respect to FIG. 5), and the phase difference associated with the at least one sensed object may be based on at least one difference between the at least one measurement of the phase for the at least two antennas of the uniform linear array. In aspects, the sensing configuration 606 may include, or may be associated with (as provided/transmitted by the network entity 604 to the sensing entity 602) a crowdsourcing indication that indicates a sensing identifier of the sensing entity 602 and target information. The target information may include at least one of a range, an angle, a speed, a location, or a target identifier of the at least one object, and the crowdsourcing indication may be provided/transmitted to at least one additional sensing entity.

At 1104, the network entity obtains, from the sensing entity and based on the sensing configuration, an indication of the at least one measurement of the phase and the phase difference. As an example, the obtainment may be performed, at least in part, by the component 199. FIGS. 6-8 illustrate an example of the network entity 604 obtaining such an indication from a sensing entity (e.g., the sensing entity 602).

The sensing entity 602 may be configured to provide, for the network entity 604 and based on the sensing configuration 606, an indication 612 of the at least one performed measurement of the phase or the phase difference. The indication 612 of the at least one performed measurement of the phase or the phase difference may include indicia of monostatic sensing or bistatic sensing (e.g., for 608). The indication 612 of the at least one performed measurement of the phase or the phase difference may indicate, in aspects, at least one of the sensing identifier, the target identifier, a time stamp associated with the at least one measurement of the phase or the phase difference, or an antenna index of the sensing entity 602.

Figure 12:
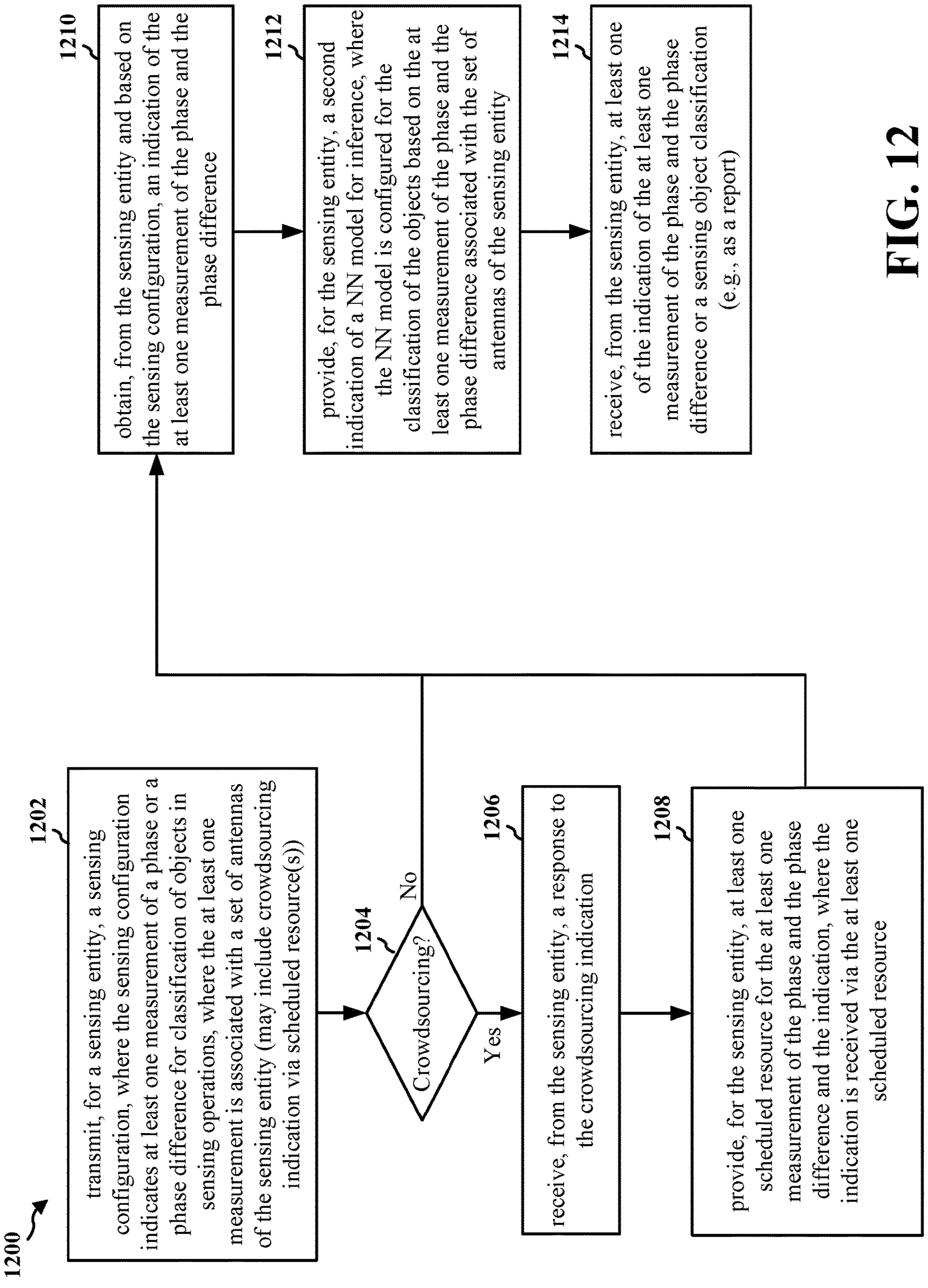
FIG. 12 is a flowchart of a method of wireless communication, in accordance with various aspects of the present disclosure.

FIG. 12 is a flowchart 1200 of a method of wireless communication, in accordance with various aspects of the present disclosure. The method may be performed by a network entity and/or a network node (e.g., the base station 102, 704; the sensing server 702; the network entity 604, 804, 1302, 1402, 1560). The method provides for phase difference based object classification in sensing that enables a sensing entity to utilize the phases and phase differences of received signals from multiple antennas of a sensing entity for sensing target/object classification assisted by NN models. The method provides for determinations of variances in motions via Doppler and/or micro-Doppler effects for NN training by obtaining phase and phase difference measurements of sensing targets, provide for improved sensing target classifications, e.g., types of objects/targets, by training and utilizing a NN model based on the phase and phase difference measurements, and provide for further improved sensing target classifications and ML training of NN models by performing crowdsourcing operations for phase and phase difference measurements, e.g., based on differing measurements across antennas of a sensing entity.

At 1202, the network entity transmits, for a sensing entity, a sensing configuration, where the sensing configuration indicates at least one measurement of a phase or a phase difference for classification of objects in sensing operations, where the at least one measurement is associated with a set of antennas of the sensing entity. As an example, the transmission/provision may be performed, at least in part, by the component 199. FIGS. 6-8 illustrate an example of the network entity 604 transmitting/providing such a sensing configuration for a sensing entity (e.g., the sensing entity 602).

The sensing entity 602 may be configured to receive, from (transmitted/provided by) the network entity 604, a sensing configuration 606. The sensing configuration 606 may indicate at least one measurement of a phase or a phase difference for classification of objects in sensing operations. The at least one measurement may be associated with a set of antennas of the sensing entity 602. In aspects, the set of antennas may include at least two antennas of a uniform linear array (e.g., as described with respect to FIG. 5), and the phase difference associated with the at least one sensed object may be based on at least one difference between the at least one measurement of the phase for the at least two antennas of the uniform linear array. In aspects, the sensing configuration 606 may include, or may be associated with (as provided/transmitted by the network entity 604 to the sensing entity 602) a crowdsourcing indication that indicates a sensing identifier of the sensing entity 602 and target information. The target information may include at least one of a range, an angle, a speed, a location, or a target identifier of the at least one object, and the crowdsourcing indication may be provided/transmitted to at least one additional sensing entity.

At 1204, it is determined if a crowdsourcing operation is to be performed. As an example, the reception may be performed, at least in part, by the component 199. For instance, a crowdsourcing indication associated with the sensing configuration 606 may be received by the sensing entity 602 from the network entity 604. If a crowdsourcing operation is to be performed, flowchart 1200 continues to 1206; if not, flowchart 1200 continues to 1210.

At 1206, the network entity receives, from the sensing entity, a response to the crowdsourcing indication. As an example, the reception may be performed, at least in part, by the component 199. FIGS. 6-8 illustrate an example of the network entity 804 (e.g., 604 in FIG. 6) receiving such a response from a sensing entity (e.g., the sensing entity 802 (e.g., 602 in FIG. 6)).

When a sensing entity or node in the set of sensing entities 820 (e.g., a UE or a base station, gNB, etc., such as the sensing entity 802) reports different phases $$\left(\text{e.g., } \Phi_{m,l}^{u}\right)$$

and/or phase differences $$\left(\text{e.g., } \Delta\Phi_{m,l}^{u}\right)$$

across antennas of its set of antennas to the network entity 804 (e.g., a sensing server), the network entity 804 may initiate a specific data collection session, referred to herein as "crowdsourcing." The network entity 804 may provide, e.g., page, multicast, groupcast, broadcast, and/or unicast to two or more of the set of sensing entities 820 that are geographically close to the sensing target 818 associated with the phase measurements $$\left(\text{e.g., the different } \Phi_{m,l}^{u} \text{ and/or } \Delta\Phi_{m,l}^{u}\right).$$

In aspects, the network entity 804 may allocate a target identifier (ID) and provide a request (e.g., a crowdsourcing indication 822) to the set of sensing entities 820 for assistance data regarding the associated target information, such as a range, a speed, an angle, a location, a target ID, and/or the like.

The sensing entities of the set of sensing entities 820 may each provide, for the network entity 804, a response to the crowdsourcing indication 822. That is, the ones of the set of sensing entities 820 that are able, or not, to participate in the crowdsourcing measurements may respond quickly to the on-demand request of the crowdsourcing indication 822 so that the network entity 804 may schedule a resource(s) 826 for the $$\Phi_{m,l}^{u} \text{ and/or } \Delta\Phi_{m,l}^{u}$$

measurements and reports for the sensing entities of the set of sensing entities 820.

At 1208, the network entity provides, for the sensing entity, at least one scheduled resource for the at least one measurement of the phase and the phase difference and the indication, where the indication is received via the at least one scheduled resource. As an example, the provision may be performed, at least in part, by the component 199. FIGS. 6-8 illustrate an example of the network entity 804 (e.g., 604 in FIG. 6) providing such a scheduled resource(s) for a sensing entity (e.g., the sensing entity 802 (e.g., 602 in FIG. 6)).

The sensing entities of the set of sensing entities 820 may receive, from the network entity 804, at least one scheduled resource 824 for the at least one measurement of the phase or the phase difference. Participating sensing entities of the set of sensing entities 820 for the crowdsourcing operation may sense the sensing target 818 and perform the at least one measurement of the phase or the phase difference associated with the sensing target 818 based on the at least one scheduled resource 824, as described herein (e.g., with respect to the call flow diagram 600 in FIG. 6). The reported $$\Phi_{m,l}^{u} \text{ and/or } \Delta\Phi_{m,l}^{u}$$

of the participating sensing entities of the set of sensing entities 820 may be associated with an ID, a target ID, a time stamp, an antenna index, and/or the like, for the respective sensing entities (e.g., the sensing entity 802, the sensing entity 802', . . . , and the sensing entity 802") of the set of sensing entities 820. In aspects, reported results of crowdsourcing operations may be utilized by the network entity 804 to perform classification of sensing targets/objects and/or to perform ML training or retraining for NN models, as described herein.

At 1210, the network entity obtains, from the sensing entity and based on the sensing configuration, an indication of the at least one measurement of the phase and the phase difference. As an example, the obtainment may be performed, at least in part, by the component 199. FIGS. 6-8 illustrate an example of the network entity 604 obtaining such an indication from a sensing entity (e.g., the sensing entity 602).

The sensing entity 602 may be configured to provide, for the network entity 604 and based on the sensing configuration 606, an indication 612 of the at least one performed measurement of the phase or the phase difference. The indication 612 of the at least one performed measurement of the phase or the phase difference may include indicia of monostatic sensing or bistatic sensing (e.g., for 608). The indication 612 of the at least one performed measurement of the phase or the phase difference may indicate, in aspects, at least one of the sensing identifier, the target identifier, a time stamp associated with the at least one measurement of the phase or the phase difference, or an antenna index of the sensing entity 602.

At 1212, the network entity provides, for the sensing entity, a second indication of a NN model for inference, where the NN model is configured for the classification of the objects based on the at least one measurement of the phase and the phase difference associated with the set of antennas of the sensing entity. As an example, the reception may be performed, at least in part, by the component 199. FIGS. 6-8 illustrate an example of the network entity 604 providing such an indication of a NN model for inference for a sensing entity (e.g., the sensing entity 602).

The network entity 604 may be configured to transmit/provide, and the sensing entity 602 may be configured to receive, an indication of a NN model 614. In aspects, the NN model 614 may be trained by the network entity 604 based on training data (e.g., associated with prior sensing measurements for phases/phase differences). In aspects, the NN model 614 may be based on machine learning or ML training associated with the at least one measurement of the phase or the phase difference of the indication 612. For instance, when one moving target is considered for sensing, and it is not spinning or rotating, the phase difference of the signals received between the adjacent antenna element may be constant. As one example, when a vehicle is traveling on a road, the vehicle body(ies) may not spin or rotate, etc. However, if the target is moving and parts of it are moving separately (e.g., wheels of a vehicle are rotating), many signals with different phases, which are generated due to the micro-Doppler effect, may be detected in the Rx (e.g., the sensing entity 602).

As another example, when a pedestrian is walking, in addition to the bulk translation of the body of the pedestrian, their legs and arms periodically rotate. In the vehicle context, when the vehicle is traveling on the road, the wheels may rotate, as noted above. Therefore, a deep neural network may be utilized as a classifier, and the phase, $$\Phi^u_{m,l},$$

and/or the phase difference, $$\Delta\Phi^u_{m,l},$$

of the received signals may be used as inputs to the NN. In the context of the pedestrian object case, the phase and/or phase difference may not overlap, and the non-coherent phases may be found. In the context of the vehicle object case, the phase and/or phase difference may be similar, or their shape may be similar. The variance of the phase difference between the signals reflected from a pedestrian and/or a vehicle may also be used to differentiate pedestrian objects and vehicle objects.

At 1214, the network entity receives, from the sensing entity, at least one of the indication of the at least one measurement of the phase and the phase difference or a sensing object classification (e.g., as a report). As an example, the reception may be performed, at least in part, by the component 199. FIGS. 6-8 illustrate an example of the network entity 604 receiving such an indication from a sensing entity (e.g., the sensing entity 602).

The sensing entity 602 may be configured to classify (at 616), via the NN model 614, the at least one sensed object based on the phase or the phase difference from the set of antennas of the sensing entity 602. In aspects, the sensing entity 602 may be configured to classify (at 616), via the NN model 614, the at least one sensed object based on a variance of the phase difference. That is, the network entity 604 may be configured to generate the NN model 614 to infer the classification of the objects based on the variance in the at least one measurement of the phase difference. Such classification (at 616) may indicate an object(s) as pedestrians, vehicles, and/or any other type of object, such as objects that move in various manners. The sensing entity 602 may be configured to transmit/provide, and the network entity 604 may be configured to receive, an object classification 618 that may be based on the classification (e.g., at 616) of the at least one sensed object. The network entity 604 may utilize the object classification 618 to verify such classifications, to train/retrain the NN model 614, and/or the like.

Figure 13:
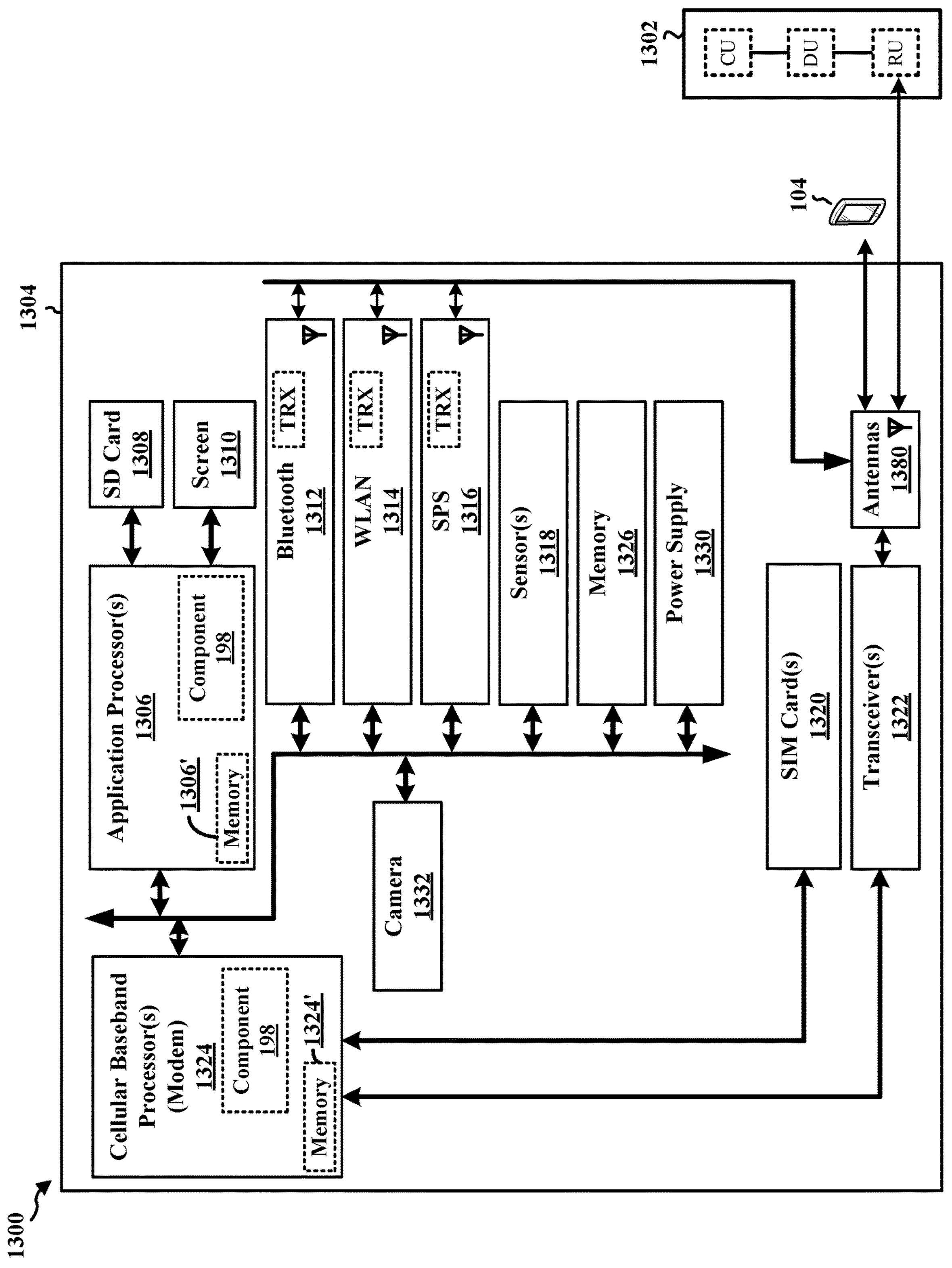
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the component 198 may be configured to receive, from a network entity, a sensing configuration, where the sensing configuration indicates at least one measurement of a phase or a phase difference for classification of objects in sensing operations, where the at least one measurement is associated with a set of antennas of the sensing entity. The component 198 may also be configured to sense, based on the sensing configuration, at least one object via the set of antennas. The component 198 may also be configured to perform the at least one measurement of the phase or the phase difference associated with the at least one sensed object. The component 198 may also be configured to provide, for the network entity and based on the sensing configuration, an indication of the at least one performed measurement of the phase or the phase difference. The component 198 may be configured to receive, from the network entity, a second indication of a NN model for inference. The component 198 may be configured to classify, via the NN model, the at least one sensed object based on the phase or the phase difference from the set of antennas of the sensing entity. The component 198 may be configured to provide, for the network entity, a response to the crowdsourcing indication. The component 198 may be configured to receive, from the network entity, at least one scheduled resource for the at least one measurement of the phase or the phase difference and the indication, where to provide the indication, the component 198 may be configured to provide the indication via the at least one scheduled resource. The component 198 may be further configured to perform any of the aspects described in connection with the flowcharts in any of FIGS. 9-12, and/or any of the aspects performed by the UE in any of FIGS. 5-8. The component 198 may be within the cellular baseband processor(s) 1324, the application processor(s) 1306, or both the cellular baseband processor(s) 1324 and the application processor(s) 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, may include means for receiving, from a network entity, a sensing configuration, where the sensing configuration indicates at least one measurement of a phase or a phase difference for classification of objects in sensing operations, where the at least one measurement is associated with a set of antennas of the sensing entity. In the configuration, the apparatus 1304, and in particular the cellular baseband processor(s) 1324 and/or the application processor(s) 1306, may include means for sensing, based on the sensing configuration, at least one object via the set of antennas. In the configuration, the apparatus 1304, and in particular the cellular baseband processor(s) 1324 and/or the application processor(s) 1306, may include means for performing the at least one measurement of the phase or the phase difference associated with the at least one sensed object. In the configuration, the apparatus 1304, and in particular the cellular baseband processor(s) 1324 and/or the application processor(s) 1306, may include means for providing, for the network entity and based on the sensing configuration, an indication of the at least one performed measurement of the phase or the phase difference. In one configuration, the apparatus 1304, and in particular the cellular baseband processor(s) 1324 and/or the application processor(s) 1306, may include means for receiving, from the network entity, a second indication of a NN model for inference. In one configuration, the apparatus 1304, and in particular the cellular baseband processor(s) 1324 and/or the application processor(s) 1306, may include means for classifying, via the NN model, the at least one sensed object based on the phase or the phase difference from the set of antennas of the sensing entity. In one configuration, the apparatus 1304, and in particular the cellular baseband processor(s) 1324 and/or the application processor(s) 1306, may include means for providing, for the network entity, a response to the crowdsourcing indication. In one configuration, the apparatus 1304, and in particular the cellular baseband processor(s) 1324 and/or the application processor(s) 1306, may include means for receiving, from the network entity, at least one scheduled resource for the at least one measurement of the phase or the phase difference and the indication, where the means may be for providing the indication via the at least one scheduled resource. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
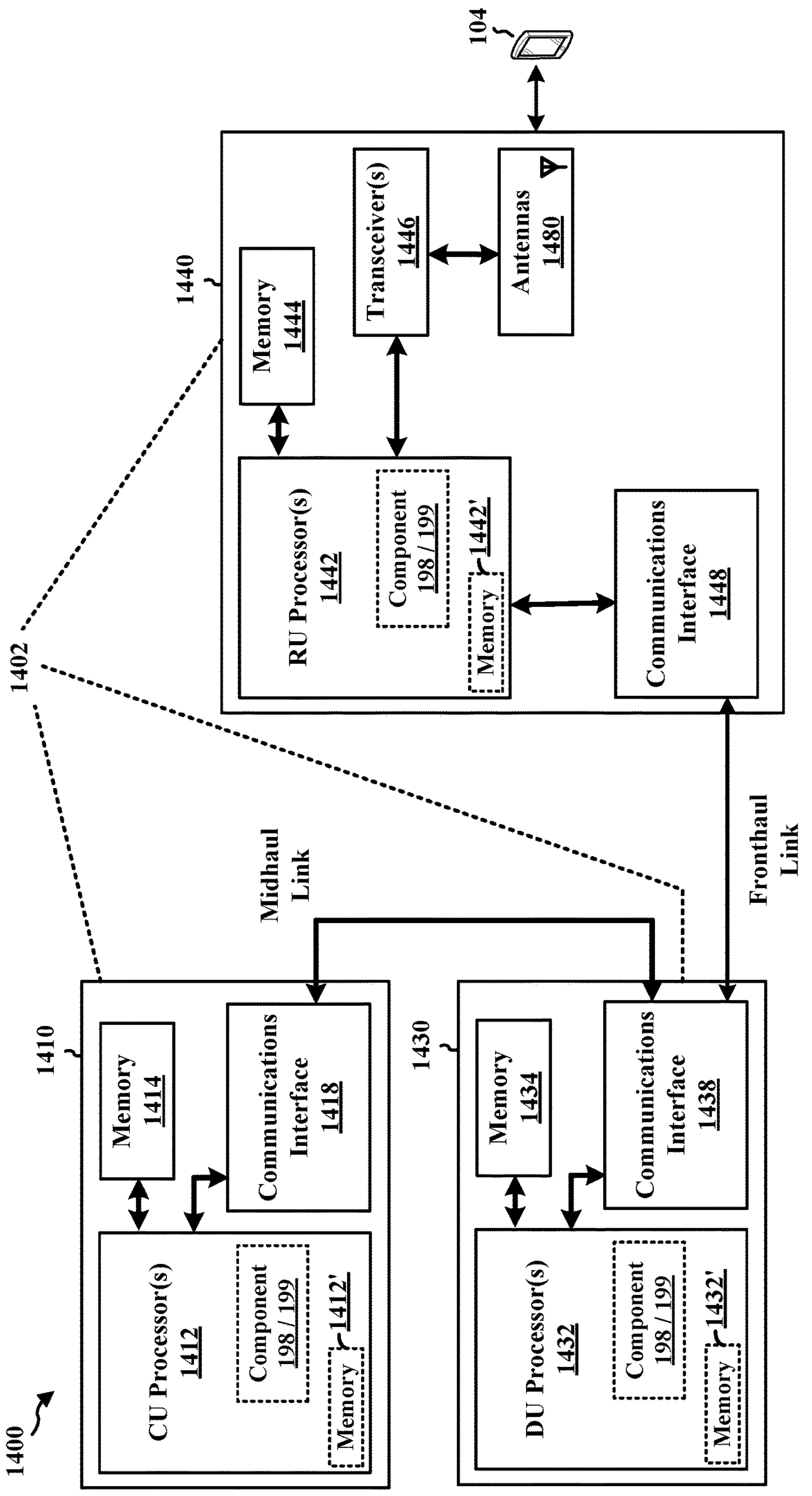
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 198 and/or the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor 1412. The CU processor(s) 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor 1432. The DU processor(s) 1432 may include on-chip memory 1432'. In some aspects, the DU 1430 may further include additional memory modules 1434 and a communications interface 1438. The DU 1430 communicates with the RU 1440 through a fronthaul link. The RU 1440 may include at least one RU processor 1442. The RU processor(s) 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive, from a network entity, a sensing configuration, where the sensing configuration indicates at least one measurement of a phase or a phase difference for classification of objects in sensing operations, where the at least one measurement is associated with a set of antennas of the sensing entity. The component 198 may also be configured to sense, based on the sensing configuration, at least one object via the set of antennas. The component 198 may also be configured to perform the at least one measurement of the phase or the phase difference associated with the at least one sensed object. The component 198 may also be configured to provide, for the network entity and based on the sensing configuration, an indication of the at least one performed measurement of the phase or the phase difference. The component 198 may be configured to receive, from the network entity, a second indication of a NN model for inference. The component 198 may be configured to classify, via the NN model, the at least one sensed object based on the phase or the phase difference from the set of antennas of the sensing entity. The component 198 may be configured to provide, for the network entity, a response to the crowdsourcing indication. The component 198 may be configured to receive, from the network entity, at least one scheduled resource for the at least one measurement of the phase or the phase difference and the indication, where to provide the indication, the component 198 may be configured to provide the indication via the at least one scheduled resource. As discussed supra, the component 199 may be configured to transmit, for a sensing entity, a sensing configuration, where the sensing configuration indicates at least one measurement of a phase or a phase difference for classification of objects in sensing operations, where the at least one measurement is associated with a set of antennas of the sensing entity. The component 199 may also be configured to obtain, from the sensing entity and based on the sensing configuration, an indication of the at least one measurement of the phase or the phase difference. The component 199 may be configured to provide, for the sensing entity, a second indication of a NN model for inference, where the NN model is configured for the classification of the objects based on the at least one measurement of the phase or the phase difference associated with the set of antennas of the sensing entity. The component 199 may be configured to receive, from the sensing entity, a response to the crowdsourcing indication. The component 199 may be configured to provide, for the sensing entity, at least one scheduled resource for the at least one measurement of the phase or the phase difference and the indication, where to receive the indication, the component 199 may be configured to receive the indication via the at least one scheduled resource. The component 198 and/or the component 199 may be further configured to perform any of the aspects described in connection with the flowcharts in any of FIGS. 9-12, and/or any of the aspects performed by the UE in any of FIGS. 5-8. The component 198 and/or the component 199 may be within one or more processors of one or more of the CU 1410, DU 1430, and the RU 1440. The component 198 and/or the component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 may include means for receiving, from a network entity, a sensing configuration, where the sensing configuration indicates at least one measurement of a phase or a phase difference for classification of objects in sensing operations, where the at least one measurement is associated with a set of antennas of the sensing entity. In the configuration, the network entity 1402 may include means for sensing, based on the sensing configuration, at least one object via the set of antennas. In the configuration, the network entity 1402 may include means for performing the at least one measurement of the phase or the phase difference associated with the at least one sensed object. In the configuration, the network entity 1402 may include means for providing, for the network entity and based on the sensing configuration, an indication of the at least one performed measurement of the phase or the phase difference. In one configuration, the network entity 1402 may include means for receiving, from the network entity, a second indication of a NN model for inference. In one configuration, the network entity 1402 may include means for classifying, via the NN model, the at least one sensed object based on the phase or the phase difference from the set of antennas of the sensing entity. In one configuration, the network entity 1402 may include means for providing, for the network entity, a response to the crowdsourcing indication. In one configuration, the network entity 1402 may include means for receiving, from the network entity, at least one scheduled resource for the at least one measurement of the phase or the phase difference and the indication, where the means may be for providing the indication via the at least one scheduled resource. In one configuration, the network entity 1402 may include means for transmitting, for a sensing entity, a sensing configuration, where the sensing configuration indicates at least one measurement of a phase or a phase difference for classification of objects in sensing operations, where the at least one measurement is associated with a set of antennas of the sensing entity. In the configuration, the network entity 1402 may include means for obtaining, from the sensing entity and based on the sensing configuration, an indication of the at least one measurement of the phase or the phase difference. In one configuration, the network entity 1402 may include means for providing, for the sensing entity, a second indication of a NN model for inference, the NN model is configured for the classification of the objects based on the at least one measurement of the phase or the phase difference associated with the set of antennas of the sensing entity. In one configuration, the network entity 1402 may include means for receiving, from the sensing entity, a response to the crowdsourcing indication. In one configuration, the network entity 1402 may include means for providing, for the sensing entity, at least one scheduled resource for the at least one measurement of the phase or the phase difference and the indication, where the means may be for receiving the indication via the at least one scheduled resource. The means may be the component 198 and/or the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Figure 15:
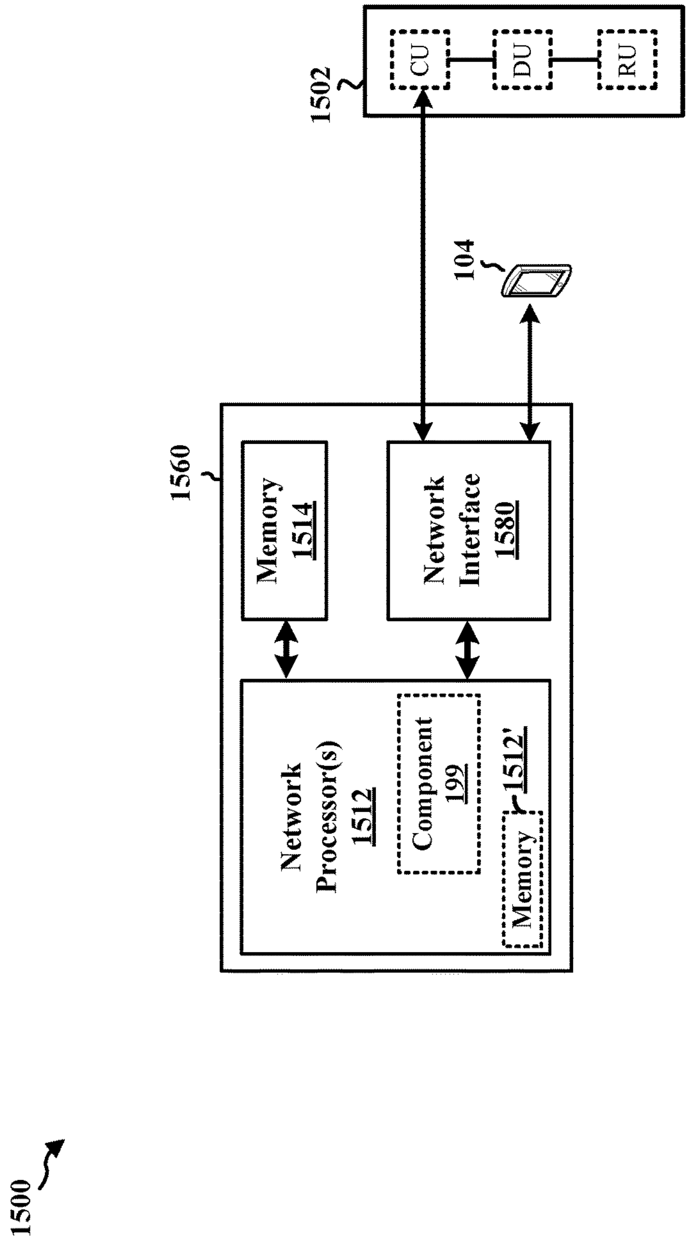
FIG. 15 is a diagram illustrating an example of a hardware implementation for an example network entity.

FIG. 15 is a diagram 1500 illustrating an example of a hardware implementation for a network entity 1560. In one example, the network entity 1560 may be within the core network 120. The network entity 1560 may include at least one network processor 1512. The network processor(s) 1512 may include on-chip memory 1512'. In some aspects, the network entity 1560 may further include additional memory modules 1514. The network entity 1560 communicates via the network interface 1580 directly (e.g., backhaul link) or indirectly (e.g., through a RIC) with the CU 1502 and/or with the UE 104. The on-chip memory 1512' and the additional memory modules 1514 may each be considered a computer-readable medium/memory. Each computer-readable medium/memory may be non-transitory. The network processor(s) 1512 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit, for a sensing entity, a sensing configuration, where the sensing configuration indicates at least one measurement of a phase or a phase difference for classification of objects in sensing operations, where the at least one measurement is associated with a set of antennas of the sensing entity. The component 199 may also be configured to obtain, from the sensing entity and based on the sensing configuration, an indication of the at least one measurement of the phase or the phase difference. The component 199 may be configured to provide, for the sensing entity, a second indication of a NN model for inference, where the NN model is configured for the classification of the objects based on the at least one measurement of the phase or the phase difference associated with the set of antennas of the sensing entity. The component 199 may be configured to receive, from the sensing entity, a response to the crowdsourcing indication. The component 199 may be configured to provide, for the sensing entity, at least one scheduled resource for the at least one measurement of the phase or the phase difference and the indication, where to receive the indication, the component 199 may be configured to receive the indication via the at least one scheduled resource. The component 199 may be further configured to perform any of the aspects described in connection with the flowcharts in any of FIGS. 9-12, and/or any of the aspects performed by the UE in any of FIGS. 5-8. The component 199 may be within the network processor(s) 1512. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1560 may include a variety of components configured for various functions. In one configuration, the network entity 1560 may include means for transmitting, for a sensing entity, a sensing configuration, where the sensing configuration indicates at least one measurement of a phase or a phase difference for classification of objects in sensing operations, where the at least one measurement is associated with a set of antennas of the sensing entity. In the configuration, the network entity 1560 may include means for obtaining, from the sensing entity and based on the sensing configuration, an indication of the at least one measurement of the phase or the phase difference. In one configuration, the network entity 1560 may include means for providing, for the sensing entity, a second indication of a NN model for inference, the NN model is configured for the classification of the objects based on the at least one measurement of the phase or the phase difference associated with the set of antennas of the sensing entity. In one configuration, the network entity 1560 may include means for receiving, from the sensing entity, a response to the crowdsourcing indication. In one configuration, the network entity 1560 may include means for providing, for the sensing entity, at least one scheduled resource for the at least one measurement of the phase or the phase difference and the indication, where to receive the indication, the at least one processor, individually or in any combination, is configured to receive the indication via the at least one scheduled resource. The means may be the component 199 of the network entity 1560 configured to perform the functions recited by the means.

Wireless communication networks and/or wireless devices may utilize a specific waveform for communications and sensing, such as RADAR waveforms, OFDM waveforms, etc., for JCS/ISAC. The use of such a waveform may provide for low cost, allow flexibility, and allow the re-use of sensing waveforms for multiple purposes. As the bandwidth allocated for cellular communications system (e.g., 5G and 5G+) becomes larger, and more use cases are introduced with cellular communications system, JCS/ISAC may also be a much-utilized feature for future cellular systems (e.g., 6G). Systems utilizing RADAR may send probing signals to uncooperative targets, and infer useful information contained in the target echoes. In some communication systems, information exchange may occur between two or more cooperative transceivers. With JCS/ISAC, an integrated system may simultaneously perform both wireless communication and remote RADAR sensing, thus providing a cost-efficient deployment for both RADAR and communication systems. That is, time, frequency, and/or spatial radio resources may be allocated to support two purposes (e.g., communication and sensing) in such integrated system. In automotive RADAR sensing systems, FMCW RADAR may generally be equipped in vehicles to extract the target information with respect to the relative velocity and relative range. As the targets may be detected even in bad weather conditions or low light environments, RADAR provide useful functions for drivers, such as adaptive cruise control, autonomous emergency braking, blind spot detection, and/or the like. Target recognition and classification may also impact sensing systems as they are related to the lives of people. However, existing classification mechanisms may lack the ability to distinguish between different types of objects, such as between pedestrians and vehicles.

The described aspects for sensing operations, e.g., phase difference based object classification in sensing, enable wireless devices and base stations, as sensing entities, for improved sensing and target classifications. In one example, a sensing entity may receive, from a network entity, a sensing configuration, where the sensing configuration indicates at least one measurement of a phase or a phase difference for classification of objects in sensing operations, where the at least one measurement is associated with a set of antennas of the sensing entity. The sensing entity may also sense, based on the sensing configuration, at least one object via the set of antennas. The sensing entity may also perform the at least one measurement of the phase or the phase difference associated with the at least one sensed object. The sensing entity may also provide, for the network entity and based on the sensing configuration, an indication of the at least one performed measurement of the phase or the phase difference. The sensing entity may receive, from the network entity, a second indication of a NN model for inference. The sensing entity may classify, via the NN model, the at least one sensed object based on the phase or the phase difference from the set of antennas of the sensing entity. The sensing entity may provide, for the network entity, a response to the crowdsourcing indication. The sensing entity may receive, from the network entity, at least one scheduled resource for the at least one measurement of the phase or the phase difference and the indication, where to provide the indication, the sensing entity may provide the indication via the at least one scheduled resource. In another example, a network entity may transmit, for a sensing entity, a sensing configuration, where the sensing configuration indicates at least one measurement of a phase or a phase difference for classification of objects in sensing operations, where the at least one measurement is associated with a set of antennas of the sensing entity. The network entity may also obtain, from the sensing entity and based on the sensing configuration, an indication of the at least one measurement of the phase or the phase difference. The network entity may provide, for the sensing entity, a second indication of a NN model for inference, where the NN model is configured for the classification of the objects based on the at least one measurement of the phase or the phase difference associated with the set of antennas of the sensing entity. The network entity may receive, from the sensing entity, a response to the crowdsourcing indication. The network entity may provide, for the sensing entity, at least one scheduled resource for the at least one measurement of the phase or the phase difference and the indication, where to receive the indication, the network entity may receive the indication via the at least one scheduled resource.

Various aspects herein, such as for phase difference based object classification in sensing, may provide for determinations of variances in motions via Doppler and/or micro-Doppler effects for NN training by obtaining phase and phase difference measurements of sensing targets. Aspects herein may provide for improved sensing target classifications, e.g., types of objects/targets, by training and utilizing a NN model based on the phase and phase difference measurements. Aspects herein may also provide for further improved sensing target classifications and ML training of NN models by performing crowdsourcing operations for phase and phase difference measurements, e.g., based on differing measurements across antennas of a sensing entity.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a sensing entity, comprising: receiving, from a network entity, a sensing configuration, wherein the sensing configuration indicates at least one measurement of a phase or a phase difference for classification of objects in sensing operations, wherein the at least one measurement is associated with a set of antennas of the sensing entity; sensing, based on the sensing configuration, at least one object via the set of antennas; performing the at least one measurement of the phase and the phase difference associated with the at least one sensed object; and providing, for the network entity and based on the sensing configuration, an indication of the at least one performed measurement of the phase or the phase difference.

Aspect 2 is the method of aspect 1, further comprising: receiving, from the network entity, a second indication of a neural network (NN) model for inference; and classifying, via the NN model, the at least one sensed object based on the phase or the phase difference from the set of antennas of the sensing entity.

Aspect 3 is the method of aspect 2, wherein classifying, via the NN model, the at least one sensed object based on the phase or the phase difference includes classifying the at least one sensed object based on a variance of the phase difference.

Aspect 4 is the method of aspect 2, wherein providing the indication of the at least one performed measurement of the phase or the phase difference includes providing, for the network entity and based on the sensing configuration, an object classification that is based on the classification of the at least one sensed object.

Aspect 5 is the method of any of aspects 1 to 4, wherein the set of antennas includes at least two antennas of a uniform linear array, and wherein the phase difference associated with the at least one sensed object is based on at least one difference between the at least one measurement of the phase for the at least two antennas.

Aspect 6 is the method of any of aspects 1 to 5, wherein sensing the at least one object includes sensing the at least one object via monostatic sensing or bistatic sensing, and wherein the indication of the at least one performed measurement of the phase or the phase difference includes indicia of the monostatic sensing or the bistatic sensing.

Aspect 7 is the method of any of aspects 1 to 6, wherein the sensing entity comprises at least one of a user equipment (UE) or a network node.

Aspect 8 is the method of any of aspects 1 to 7, wherein receiving the sensing configuration includes receiving, from the network entity, a crowdsourcing indication, wherein the crowdsourcing indication indicates a sensing identifier of the sensing entity and target information, wherein the target information includes at least one of a range, an angle, a speed, a location, or a target identifier of the at least one object; and wherein performing the at least one measurement of the phase or the phase difference is based on the crowdsourcing indication.

Aspect 9 is the method of aspect 8, wherein the indication of the at least one performed measurement of the phase or the phase difference indicates at least one of the sensing identifier, the target identifier, a time stamp associated with the at least one measurement of the phase or the phase difference, or an antenna index of the sensing entity.

Aspect 10 is the method of aspect 8, further comprising: providing, for the network entity, a response to the crowdsourcing indication; and receiving, from the network entity, at least one scheduled resource for the at least one measurement of the phase or the phase difference and the indication, wherein providing the indication includes providing the indication via the at least one scheduled resource.

Aspect 11 is a method of wireless communication at a network entity, comprising: transmitting, for a sensing entity, a sensing configuration, wherein the sensing configuration indicates at least one measurement of a phase or a phase difference for classification of objects in sensing operations, wherein the at least one measurement is associated with a set of antennas of the sensing entity; and obtaining, from the sensing entity and based on the sensing configuration, an indication of the at least one measurement of the phase or the phase difference.

Aspect 12 is the method of aspect 11, further comprising: providing, for the sensing entity, a second indication of a neural network (NN) model for inference, wherein the NN model is configured for the classification of the objects based on the at least one measurement of the phase or the phase difference associated with the set of antennas of the sensing entity.

Aspect 13 is the method of aspect 12, wherein the NN model is configured to infer the classification of the objects based on a variance in the at least one measurement of the phase difference.

Aspect 14 is the method of aspect 12, wherein receiving the indication of the at least one measurement of the phase or the phase difference includes receiving an object classification of at least one sensed object of the objects.

Aspect 15 is the method of aspect 12, wherein the NN model is based on machine learning (ML) training associated with the at least one measurement of the phase or the phase difference.

Aspect 16 is the method of any of aspects 11 to 15, wherein the set of antennas includes at least two antennas of a uniform linear array, and wherein the phase difference is based on at least one difference between the at least one measurement of the phase for the at least two antennas.

Aspect 17 is the method of any of aspects 11 to 16, wherein the indication of the at least one measurement of the phase or the phase difference includes indicia of monostatic sensing or bistatic sensing.

Aspect 18 is the method of any of aspects 11 to 17, wherein the sensing entity comprises at least one of a user equipment (UE) or a network node, and wherein the network entity comprises a sensing server.

Aspect 19 is the method of any of aspects 11 to 18, wherein transmitting the sensing configuration includes transmitting a crowdsourcing indication, wherein the crowdsourcing indication indicates a sensing identifier of the sensing entity and target information, wherein the target information includes at least one of a range, an angle, a speed, a location, or a target identifier of at least one sensed object of the objects; and wherein the obtainment of the indication of the at least one measurement of the phase or the phase difference is associated with the crowdsourcing indication.

Aspect 20 is the method of aspect 19, wherein transmitting the crowdsourcing indication includes transmitting the crowdsourcing indication to at least one additional sensing entity.

Aspect 21 is the method of aspect 19, wherein the indication of the at least one measurement of the phase or the phase difference indicates at least one of the sensing identifier, the target identifier, a time stamp associated with the at least one measurement of the phase or the phase difference, or an antenna index of the sensing entity.

Aspect 22 is the method of aspect 19, further comprising: receiving, from the sensing entity, a response to the crowdsourcing indication; and providing, for the sensing entity, at least one scheduled resource for the at least one measurement of the phase or the phase difference and the indication, wherein receiving the indication includes receiving the indication via the at least one scheduled resource.

Aspect 23 is an apparatus for wireless communication including means for implementing any of aspects 1 to 10.

Aspect 24 is a computer-readable medium (e.g., a non-transitory computer-readable medium) storing computer executable code, the code when executed by at least one processor causes the at least one processor to implement any of aspects 1 to 10.

Aspect 25 is an apparatus for wireless communication at a network node. The apparatus includes at least one memory; and at least one processor coupled to the at least one memory and, based at least in part on information stored in the at least one memory, the at least one processor, individually or in any combination, is configured to implement any of aspects 1 to 10.

Aspect 26 is the apparatus of aspect 25, further including at least one of a transceiver or an antenna coupled to the at least one processor.

Aspect 27 is an apparatus for wireless communication including means for implementing any of aspects 11 to 22.

Aspect 28 is a computer-readable medium (e.g., a non-transitory computer-readable medium) storing computer executable code, the code when executed by at least one processor causes the at least one processor to implement any of aspects 11 to 22.

Aspect 29 is an apparatus for wireless communication at a network node. The apparatus includes at least one memory; and at least one processor coupled to the at least one memory and, based at least in part on information stored in the at least one memory, the at least one processor, individually or in any combination, is configured to implement any of aspects 11 to 22.

Aspect 30 is the apparatus of aspect 29, further including at least one of a transceiver or an antenna coupled to the at least one processor.

What is claimed is:

1. An apparatus for wireless communication at a sensing entity, comprising:

at least one memory; and at least one processor coupled to the at least one memory and, based at least in part on information stored in the at least one memory, the at least one processor, individually or in any combination, is configured to:

receive, from a network entity, a sensing configuration, wherein the sensing configuration indicates at least one measurement of a phase or a phase difference for classification of objects in sensing operations, wherein the at least one measurement is associated with a set of antennas of the sensing entity, wherein the sensing configuration includes a crowdsourcing indication, wherein the crowdsourcing indication indicates a sensing identifier of the sensing entity and target information, wherein the target information includes at least one of a range, an angle, a speed, a location, or a target identifier of the at least one object;

sense, based on the sensing configuration, at least one object via the set of antennas;

perform the at least one measurement of the phase or the phase difference associated with the at least one sensed object based on the crowdsourcing indication; and provide, for the network entity and based on the sensing configuration, an indication of the at least one performed measurement of the phase or the phase difference.

2. The apparatus of claim 1, wherein the at least one processor, individually or in any combination, is further configured to:

receive, from the network entity, a second indication of a neural network (NN) model for inference; and classify, via the NN model, the at least one sensed object based on the phase or the phase difference from the set of antennas of the sensing entity.

3. The apparatus of claim 2, wherein to classify, via the NN model, the at least one sensed object based on the phase or the phase difference, the at least one processor, individually or in any combination, is configured to classify the at least one sensed object based on a variance of the phase difference.

4. The apparatus of claim 2, wherein to provide the indication of the at least one performed measurement of the phase or the phase difference, the at least one processor, individually or in any combination, is configured to provide, for the network entity and based on the sensing configuration, an object classification that is based on the classification of the at least one sensed object.

5. The apparatus of claim 1, wherein the set of antennas includes at least two antennas of a uniform linear array, and wherein the phase difference associated with the at least one sensed object is based on at least one difference between the at least one measurement of the phase for the at least two antennas.

6. The apparatus of claim 1, wherein to sense the at least one object, the at least one processor, individually or in any combination, is configured to sense the at least one object via monostatic sensing or bistatic sensing, and wherein the indication of the at least one performed measurement of the phase or the phase difference includes indicia of the monostatic sensing or the bistatic sensing.

7. The apparatus of claim 1, wherein the sensing entity comprises at least one of a user equipment (UE) or a network node.

8. The apparatus of claim 1, wherein the indication of the at least one performed measurement of the phase or the phase difference indicates at least one of the sensing identifier, the target identifier, a time stamp associated with the at least one measurement of the phase or the phase difference, or an antenna index of the sensing entity.

9. The apparatus of claim 1, further comprising at least one of a transceiver or an antenna coupled to the at least one processor, wherein the at least one processor, individually or in any combination, is further configured to:

provide, for the network entity via at least one of the transceiver or the antenna, a response to the crowdsourcing indication; and receive, from the network entity via at least one of the transceiver or the antenna, at least one scheduled resource for the at least one measurement of the phase or the phase difference and the indication, wherein to provide the indication, the at least one processor, individually or in any combination, is configured to provide the indication via the at least one scheduled resource.

10. An apparatus for wireless communication at a network entity, comprising:

at least one memory; and at least one processor coupled to the at least one memory and, based at least in part on information stored in the at least one memory, the at least one processor, individually or in any combination, is configured to:

transmit, for a sensing entity, a sensing configuration, wherein the sensing configuration indicates at least one measurement of a phase or a phase difference for classification of objects in sensing operations, wherein the at least one measurement is associated with a set of antennas of the sensing entity, wherein the sensing configuration includes a crowdsourcing indication, wherein the crowdsourcing indication indicates a sensing identifier of the sensing entity and target information, wherein the target information includes at least one of a range, an angle, a speed, a location, or a target identifier of the at least one object; and obtain, from the sensing entity and based on the sensing configuration, an indication of the at least one measurement of the phase or the phase difference associated with the crowdsourcing indication.

11. The apparatus of claim 10, wherein the at least one processor, individually or in any combination, is further configured to:

provide, for the sensing entity, a second indication of a neural network (NN) model for inference, wherein the NN model is configured for the classification of the objects based on the at least one measurement of the phase or the phase difference associated with the set of antennas of the sensing entity.

12. The apparatus of claim 11, wherein the NN model is configured to infer the classification of the objects based on a variance in the at least one measurement of the phase difference.

13. The apparatus of claim 11, wherein to receive the indication of the at least one measurement of the phase or the phase difference, the at least one processor, individually or in any combination, is configured to receive an object classification of at least one sensed object of the objects.

14. The apparatus of claim 11, wherein the NN model is based on machine learning (ML) training associated with the at least one measurement of the phase or the phase difference.

15. The apparatus of claim 10, wherein the set of antennas includes at least two antennas of a uniform linear array, and wherein the phase difference is based on at least one difference between the at least one measurement of the phase for the at least two antennas.

16. The apparatus of claim 10, wherein the indication of the at least one measurement of the phase or the phase difference includes indicia of monostatic sensing or bistatic sensing.

17. The apparatus of claim 10, wherein the sensing entity comprises at least one of a user equipment (UE) or a network node, and wherein the network entity comprises a sensing server.

18. The apparatus of claim 10, wherein to transmit the crowdsourcing indication, the at least one processor, individually or in any combination, is configured to transmit the crowdsourcing indication to at least one additional sensing entity.

19. The apparatus of claim 10, wherein the indication of the at least one measurement of the phase or the phase difference indicates at least one of the sensing identifier, the target identifier, a time stamp associated with the at least one measurement of the phase or the phase difference, or an antenna index of the sensing entity.

20. The apparatus of claim 10, further comprising at least one of a transceiver or an antenna coupled to the at least one processor, wherein the at least one processor, individually or in any combination, is further configured to:

receive, from the sensing entity via at least one of the transceiver or the antenna, a response to the crowdsourcing indication; and provide, for the sensing entity via at least one of the transceiver or the antenna, at least one scheduled resource for the at least one measurement of the phase or the phase difference and the indication, wherein to receive the indication, the at least one processor, individually or in any combination, is configured to receive the indication via the at least one scheduled resource.

21. A method of wireless communication at a sensing entity, comprising:

receiving, from a network entity, a sensing configuration, wherein the sensing configuration indicates at least one measurement of a phase or a phase difference for classification of objects in sensing operations, wherein the at least one measurement is associated with a set of antennas of the sensing entity, wherein the sensing configuration includes a crowdsourcing indication, wherein the crowdsourcing indication indicates a sensing identifier of the sensing entity and target information, wherein the target information includes at least one of a range, an angle, a speed, a location, or a target identifier of the at least one object;

sensing, based on the sensing configuration, at least one object via the set of antennas;

performing the at least one measurement of the phase or the phase difference associated with the at least one sensed object based on the crowdsourcing indication; and providing, for the network entity and based on the sensing configuration, an indication of the at least one performed measurement of the phase or the phase difference.

22. The method of claim 21, further comprising:

receiving, from the network entity, a second indication of a neural network (NN) model for inference; and classifying, via the NN model, the at least one sensed object based on the phase or the phase difference from the set of antennas of the sensing entity.

23. The method of claim 22, wherein classifying, via the NN model, the at least one sensed object based on the phase or the phase difference includes classifying the at least one sensed object based on a variance of the phase difference.

24. The method of claim 22, wherein providing the indication of the at least one performed measurement of the phase or the phase difference includes providing, for the network entity and based on the sensing configuration, an object classification that is based on the classification of the at least one sensed object.

25. A method of wireless communication at a network entity, comprising:

transmitting, for a sensing entity, a sensing configuration, wherein the sensing configuration indicates at least one measurement of a phase or a phase difference for classification of objects in sensing operations, wherein the at least one measurement is associated with a set of antennas of the sensing entity, wherein the sensing configuration includes a crowdsourcing indication, wherein the crowdsourcing indication indicates a sensing identifier of the sensing entity and target information, wherein the target information includes at least one of a range, an angle, a speed, a location, or a target identifier of the at least one object; and obtaining, from the sensing entity and based on the sensing configuration, an indication of the at least one measurement of the phase or the phase difference associated with the crowdsourcing indication.

26. The method of claim 25, further comprising:

providing, for the sensing entity, a second indication of a neural network (NN) model for inference, wherein the NN model is configured for the classification of the objects based on the at least one measurement of the phase or the phase difference associated with the set of antennas of the sensing entity.

27. The method of claim 26, wherein the NN model is configured to infer the classification of the objects based on a variance in the at least one measurement of the phase difference.

28. The method of claim 26, wherein receiving the indication of the at least one measurement of the phase or the phase difference includes receiving an object classification of at least one sensed object of the objects.

* * * * *